(12) United States Patent
Pickering

(10) Patent No.: US 7,877,315 B2
(45) Date of Patent: Jan. 25, 2011

(54) SYSTEM AND METHOD FOR SWAPPING OF TANGIBLE ITEMS

(75) Inventor: Richard Pickering, Duluth, GA (US)

(73) Assignee: National Book Swap, LLC, Suwanee, GA (US)

( * ) Notice: Subject to any disclaimer, the term of this patent is extended or adjusted under 35 U.S.C. 154(b) by 741 days.

(21) Appl. No.: 11/230,910

(22) Filed: Sep. 20, 2005

(65) Prior Publication Data

US 2006/0080226 A1 Apr. 13, 2006

Related U.S. Application Data

(60) Provisional application No. 60/611,632, filed on Sep. 21, 2004.

(51) Int. Cl.
*G06Q 40/00* (2006.01)
(52) U.S. Cl. ........................................ 705/37
(58) Field of Classification Search .............. 705/14, 705/26, 35–45, 80
See application file for complete search history.

(56) References Cited

U.S. PATENT DOCUMENTS

| | | | |
|---|---|---|---|
| 4,674,044 A | 6/1987 | Kalmus et al. |
| 4,799,156 A | 1/1989 | Shavit et al. |
| 4,903,201 A | 2/1990 | Wagner |
| 4,941,090 A | 7/1990 | McCarthy |
| 4,972,318 A | 11/1990 | Brown et al. |
| 4,984,155 A | 1/1991 | Geier et al. |
| 4,992,940 A | 2/1991 | Dworkin |
| 5,077,665 A | 12/1991 | Silverman et al. |
| 5,136,501 A | 8/1992 | Silverman et al. |
| 5,283,731 A | 2/1994 | Lalonde et al. |
| 5,375,055 A | 12/1994 | Togher et al. |
| 5,402,336 A | 3/1995 | Spiegelhoff et al. |
| 5,493,490 A | 2/1996 | Johnson |
| 5,500,793 A | 3/1996 | Deming, Jr. et al. |
| 5,592,375 A | 1/1997 | Salmon et al. |
| 5,664,110 A | 9/1997 | Green et al. |
| 5,664,111 A | 9/1997 | Nahan et al. |
| 5,664,115 A | 9/1997 | Fraser |
| 5,666,493 A | 9/1997 | Wojcik et al. |
| 5,678,041 A | 10/1997 | Baker et al. |
| 5,694,551 A | 12/1997 | Doyle et al. |
| 5,710,887 A | 1/1998 | Chelliah et al. |
| 5,715,399 A | 2/1998 | Bezos |
| 5,727,048 A | 3/1998 | Hiroshima et al. |
| 5,727,163 A | 3/1998 | Bezos |
| 5,732,400 A | 3/1998 | Mandler et al. |
| 5,742,931 A | 4/1998 | Spiegelhoff et al. |
| 5,745,882 A | 4/1998 | Bixler et al. |
| 5,758,328 A | 5/1998 | Giovannoli |
| 5,794,207 A | 8/1998 | Walker et al. |

(Continued)

*Primary Examiner*—Thomas M Hammond, III
(74) *Attorney, Agent, or Firm*—John R. Kasha; Kasha Law LLC

(57) ABSTRACT

A system and method for an on-line swapping service. The service registers members and allows members to list items that each member is willing to swap in exchange for credits with the service for an item from listed by another member. An example of the items that may be swapped using the swapping service is books, such as paperback books. To facilitate delivery through the mail of an item from one member to another member, a printable mailing wrapper is created by the system with the appropriate destination address. The system emails, downloads or otherwise sends the mailing wrapper to the member who is in position of the item to be shipped. That member simply prints the mailing wrapper on a standard printer, and wraps it around the item to be shipped via standard postal services.

52 Claims, 29 Drawing Sheets

U.S. PATENT DOCUMENTS

| | | | |
|---|---|---|---|
| 5,794,219 A | 8/1998 | Brown | |
| 5,799,284 A | 8/1998 | Bourquin | |
| 5,802,497 A | 9/1998 | Manasse | |
| 5,826,242 A | 10/1998 | Montulli | |
| 5,842,178 A | 11/1998 | Giovannoli | |
| 5,845,267 A | 12/1998 | Ronen | |
| 5,850,446 A | 12/1998 | Berger et al. | |
| 5,870,733 A | 2/1999 | Bass et al. | |
| 5,878,416 A | 3/1999 | Harris et al. | |
| 5,890,138 A | 3/1999 | Godin et al. | |
| 6,058,417 A | 5/2000 | Hess et al. | |
| 6,131,087 A | 10/2000 | Luke et al. | |
| 6,671,674 B1* | 12/2003 | Anderson et al. | 705/26 |
| 6,704,716 B1* | 3/2004 | Force | 705/80 |
| 6,847,938 B1 | 1/2005 | Moore | |
| 6,988,077 B1* | 1/2006 | Walker et al. | 705/14.35 |
| 7,024,391 B2 | 4/2006 | Burich | |
| 7,058,602 B1* | 6/2006 | La Mura et al. | 705/37 |
| 7,133,847 B2* | 11/2006 | Himmelstein | 705/80 |
| 7,162,446 B1* | 1/2007 | Handler | 705/37 |
| 7,219,080 B1* | 5/2007 | Wagoner et al. | 705/37 |
| 7,225,151 B1* | 5/2007 | Konia | 705/37 |
| 7,315,832 B2* | 1/2008 | Bauer et al. | 705/26 |
| 7,324,968 B2* | 1/2008 | Rotman et al. | 705/37 |
| 7,340,433 B1* | 3/2008 | Kay et al. | 705/38 |
| 2002/0004759 A1* | 1/2002 | Bradford et al. | 705/26 |
| 2002/0023050 A1* | 2/2002 | Wakabayashi | 705/37 |
| 2002/0032632 A1* | 3/2002 | Sernet | 705/37 |
| 2002/0077925 A1* | 6/2002 | Fujita | 705/26 |
| 2002/0107786 A1* | 8/2002 | Lehmann-Haupt et al. | 705/37 |
| 2002/0120550 A1* | 8/2002 | Yang | 705/37 |
| 2003/0014351 A1* | 1/2003 | Neff et al. | 705/37 |
| 2004/0002913 A1* | 1/2004 | Breen et al. | 705/37 |
| 2004/0059659 A1* | 3/2004 | Safaei et al. | 705/35 |
| 2004/0068462 A1* | 4/2004 | Katz et al. | 705/37 |
| 2004/0103003 A1* | 5/2004 | Mayers et al. | 705/4 |
| 2004/0181481 A1* | 9/2004 | Carter | 705/39 |
| 2005/0131797 A1* | 6/2005 | Ananthanarayanan et al. | 705/37 |
| 2007/0124228 A1* | 5/2007 | Elias et al. | 705/37 |

* cited by examiner

FIG. 14

Join the fastest growing book club in America!

PaperBackSwap.com

Dear Fellow Reader,

Thanks for using PaperBackSwap.com. We hope that you enjoy this book and are pleased with the way this shared system works. By trading books with other members, we all win!

You probably know that this club was started because the founders were tired of not being able to share good used paperbacks with others. Instead of just letting paperback books collect dust on a shelf, we decided to start a club for fellow readers so that we could trade them with each other. We have read so many great books over the years, and we have always wanted to share them with friends.

But did you know that in addition to trading books with other members, you can also send a book to someone you care about who is not a member? Compare the cost of buying a card and stamps to the simplicity of using this club. We hope you start to think twice about going to the store again for a card (birthday, holiday, thinking of you, etc.) and try PaperBackSwap.com instead.

Thanks again for using PaperBackSwap.com and being part of one of the best internet clubs around.

Happy Reading,
The PaperBackSwap Team

PS: I hope you enjoy "2nd Chance" by James Patterson, Andrew Gross

PaperBackSwap.com

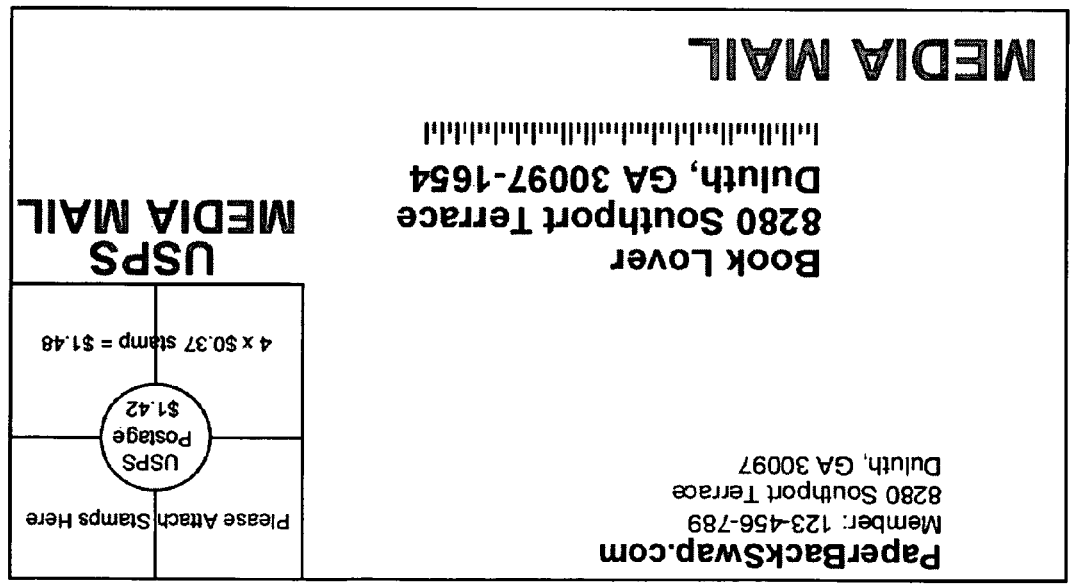

FIG. 19

[Search UnPosted Books]  [Back to Search]

You searched for: 'Tail Wagging th Dog'

*To save this search click the icon above.*

Oops, we are sorry but there are no books that match your search criteria that are actively posted in the system.

Dear Member,

We are sorry that "Tail Wagging th Dog" is not available at this time. While this book is not in our Club Library right now, it may become available in the future if another member posts the book. If the book becomes available, we can notify you via email. If you would like for us to add it to your "Wish List" then please [Click Here].

Best Regards,

Librarian at PaperBackSwap

Why don't you try to search for this book another way!

FIG. 20

Club Wish List

The following books are wanted by Club Members. If you have any of these books, and would like to earn a book credit (so that you can order another book) please post it! If the member still wants the book, you can receive a credit for mailing the book.

For details on how the Wish List process works, click below.

[Show Details]

[Show All Recent Wishes]

Search Terms: [_____]

Search by: [Title ▼] [Find that Book]

Browse by Title

A  D  G  J  M  P  S  V  Y  0  3  6
B  E  H  K  N  Q  T  W  Z  1  4  7
C  F  I  L  O  R  U  X     2  5  8
                                    9

Browse by Genre

- ⊞ Arts & Photography
- ⊞ Biographies & Memoirs
- ⊞ Business & Investing
- ⊞ Children's Books
- ⊞ Comics & Graphic Novels
- ⊞ Computers & Internet
- ⊞ Cooking, Food & Wine
- ⊞ Entertainment
- ⊞ Gay & Lesbian
- ⊞ Health, Mind & Body
- ⊞ History
- ⊞ Home & Garden
- ⊞ Horror
- ⊞ Law
- ⊞ Literature & Fiction
- ⊞ Medicine
- ⊞ Mystery & Thrillers
- ⊞ Nonfiction
- ⊞ Outdoors & Nature
- ⊞ Parenting & Families
- ⊞ Professional & Technical
- ⊞ Reference
- ⊞ Religion & Spirituality
- ⊞ Romance
- ⊞ Science
- ⊞ Science Fiction & Fantasy
- ⊞ Sports
- ⊞ Teens
- ⊞ Travel

FIG. 21

Unique results 1 to 10 of 73
Show [10 ▾] results per page.
Goto page: [1 ▾]

Recent additions only
Back to Search

Search UnPosted Books
Book Images Off

✎ You searched for: 'Robert Ludlum'
To save this search click the icon above.

NEXT PAGE ⬆

Overview | Details | Reviews (0)

*The Apocalypse Watch*
Author: Robert Ludlum
Book Type: Hardcover
Rating: *Currently No Rating*
Subject: Mystery & Thrillers
Publish Date: 1995-05-01

NO COVER AVAILABLE

ORDER THIS BOOK

Overview | Details | Reviews (3)

*The Apocalypse Watch*
Author: Robert Ludlum
Book Type: Paperback
Rating: ★★★
Subject: Mystery & Thrillers
Publish Date: 1996-04-01

NO COVER AVAILABLE

ORDER THIS BOOK

FIG. 22

 You searched for: 'Robert Ludlum'

*To save this search click the icon above.*

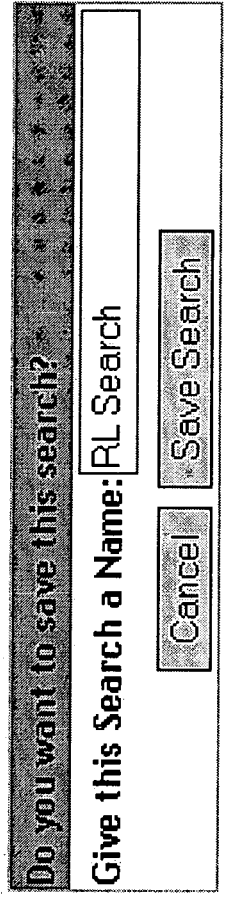

FIG. 23

My Saved Searches

When searching for books, click the  to save a search! This icon is located near the top on the results page.

Use the send alert option to get daily emails about new books posted for that particular search! You will only receive an email if there were any books posted that day that meet the search criteria.

| Name | Date Saved | Delete | Send Alert |
|---|---|---|---|
| RL Search | 9/19/2005 | X | No |

FIG. 24

Daily Digest Settings

Select from the categories below to receive daily updates on the previous days' new postings. This "Daily Digest" will be sent to you via email and will include book images unless specified otherwise.

Daily Digest Status: Off ▼

Include book images: No ▼

Sort by: group and order entire list alphabetically ▼

[ Update Digest Settings ]

- ☑ Arts & Photography
  - ☑ Art
  - ☑ Artists, A-Z
  - ☑ Fashion
  - ☑ Graphic Design
  - ☑ Performing Arts
  - ☑ Photography
- ☑ Biographies & Memoirs
  - ☑ Arts & Literature
  - ☑ Ethnic & National
  - ☑ Family & Childhood
  - ☑ General
  - ☑ Historical
  - ☑ Leaders & Notable People

- ☑ Medicine
  - ☐ Administration & Policy
  - ☐ Allied Health Professions
  - ☐ Alternative & Holistic
  - ☐ Basic Science
  - ☐ Dentistry
  - ☐ Diseases
  - ☐ Education & Training
  - ☐ General
  - ☐ Internal Medicine
  - ☐ Nursing
  - ☐ Pharmacology
  - ☐ Physician & Patient
  - ☐ Reference

FIG. 26

Profile Directory

Below are all club members who have set up public profiles. Click here to add/edit your public profile. Don't be the last member to get a profile!

You can search by any of the following fields to find members in our ever expanding club!

First name: [          ]  Nickname: [          ]

City: [          ]  State: [    ]  Email Address: [          ]

[Search]

Browse by First Name

A - B - C - D - E - F - G - H - I - J - K - L - M - N - O - P - Q - R - S - T - U - V - W - X - Y - Z

Profiles 1 to 50 of 1667
Show [10 ▾] results per page.
Goto page: [1 ▾]

[Next Page»]

| Member | Nickname | City | State | |
|---|---|---|---|---|
| A & AJ C. | AJ | Bardstown | KY | [+ Buddy List] |
| A. W. | Apolonia | Lynn | MA | [+ Buddy List] |
| A.M. B. | AM10000 | Sunnyvale | CA | [+ Buddy List] |
| Abbie D. | AbbieATC | Cincinnati | OH | [+ Buddy List] |
| Abbie W. | Abbie | Blackwood | NJ | [+ Buddy List] |
| Adriel B. | sagefire | North Tazewell | VA | [+ Buddy List] |

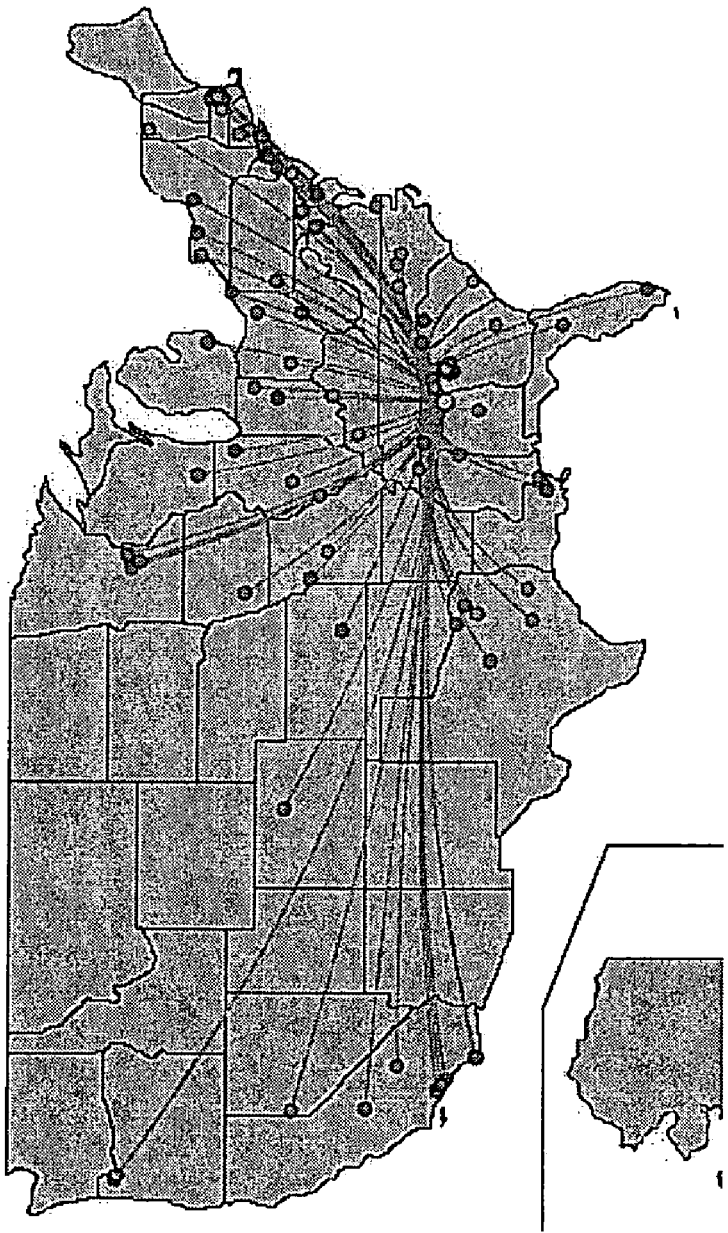

SYSTEM AND METHOD FOR SWAPPING OF TANGIBLE ITEMS

This application claims priority to U.S. Provisional Application No. 60/611,632, filed Sep. 21, 2004, the entirety of which is incorporated herein by reference.

BACKGROUND OF THE INVENTION

The proliferation of the World Wide Web has spawned many new vendors of goods and services. Many allow for sale or auction of items, whereas others provide a means to trade securities, bonds and other financial intangibles.

Despite the existence of those services, there are no on-line services heretofore known that allow users to simply swap like-kind items with other users in a convenient manner. For example, many people who are avid readers spend significant time and energy looking for new books to read, while at the same time, have built a large collection of books, digital video discs (DVDs), compact discs (CDs), etc.

What is needed is a service for managing the swapping of items, such as books, DVDs, CDs, etc., between users or subscribers to a service, and a convenient way of making delivering items.

SUMMARY OF THE INVENTION

Briefly, a system and method for an on-line swapping service is provided. The service registers members and allows members to list items that each member is willing to swap in exchange for credits with the service for an item from listed by another member. An example of the items that may be swapped using the swapping service is books, such as paperback books, CDs, DVDs, etc. Unlike existing on-line retailing services, to facilitate delivery through the mail of an item from one member to another member, a printable mailing wrapper is created by the system with the appropriate destination address. The system emails, downloads or otherwise sends the mailing wrapper to the member who is in possession of the item to be shipped. That member simply prints the mailing wrapper on a standard printer, and wraps it around the item to be shipped via standard postal services.

Other objects and advantages of the present invention will become more readily apparent when reference is made to the following description in conjunction with the accompanying drawings.

BRIEF DESCRIPTION OF THE DRAWINGS

FIG. 14 is a diagram showing an example of a pre-formatted mailing wrapper.

FIGS. 16-19 depict exemplary screens associated with a Wish List feature.

FIG. 20 depicts an exemplary screen for searching a Global Wish List associated with all members to the service.

FIGS. 21-23 depict exemplary screens associated with the Save Search feature.

FIG. 24 illustrates an exemplary screen associated with the Daily Digest feature.

FIGS. 25 and 26 illustrates exemplary screens associated with the Buddy List feature.

FIGS. 27-29 illustrate exemplary screens for the Public Profiles feature.

DETAILED DESCRIPTION

Figure 1:
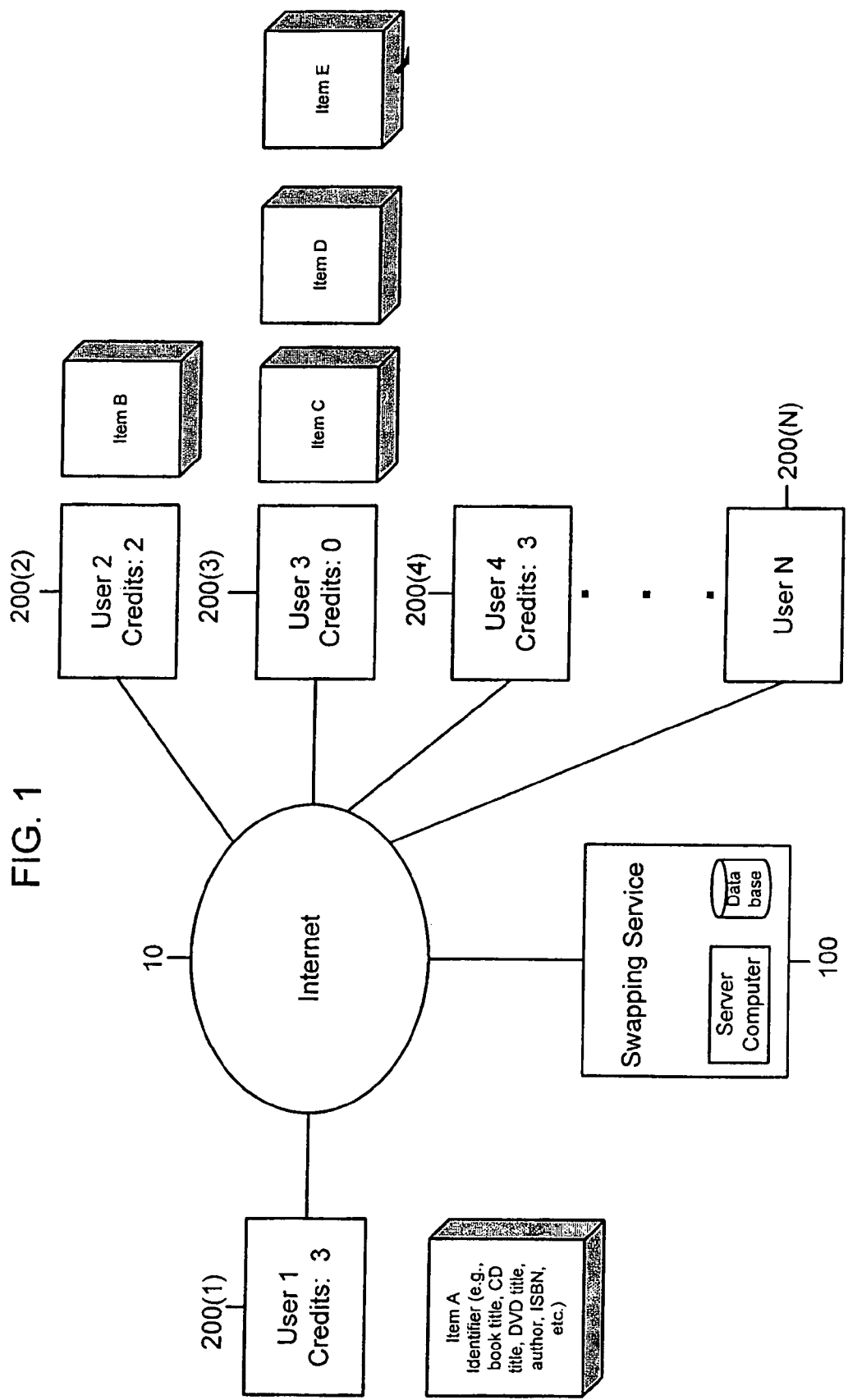
FIG. 1 is a block diagram depicting the swapping service environment.
Figure 2:
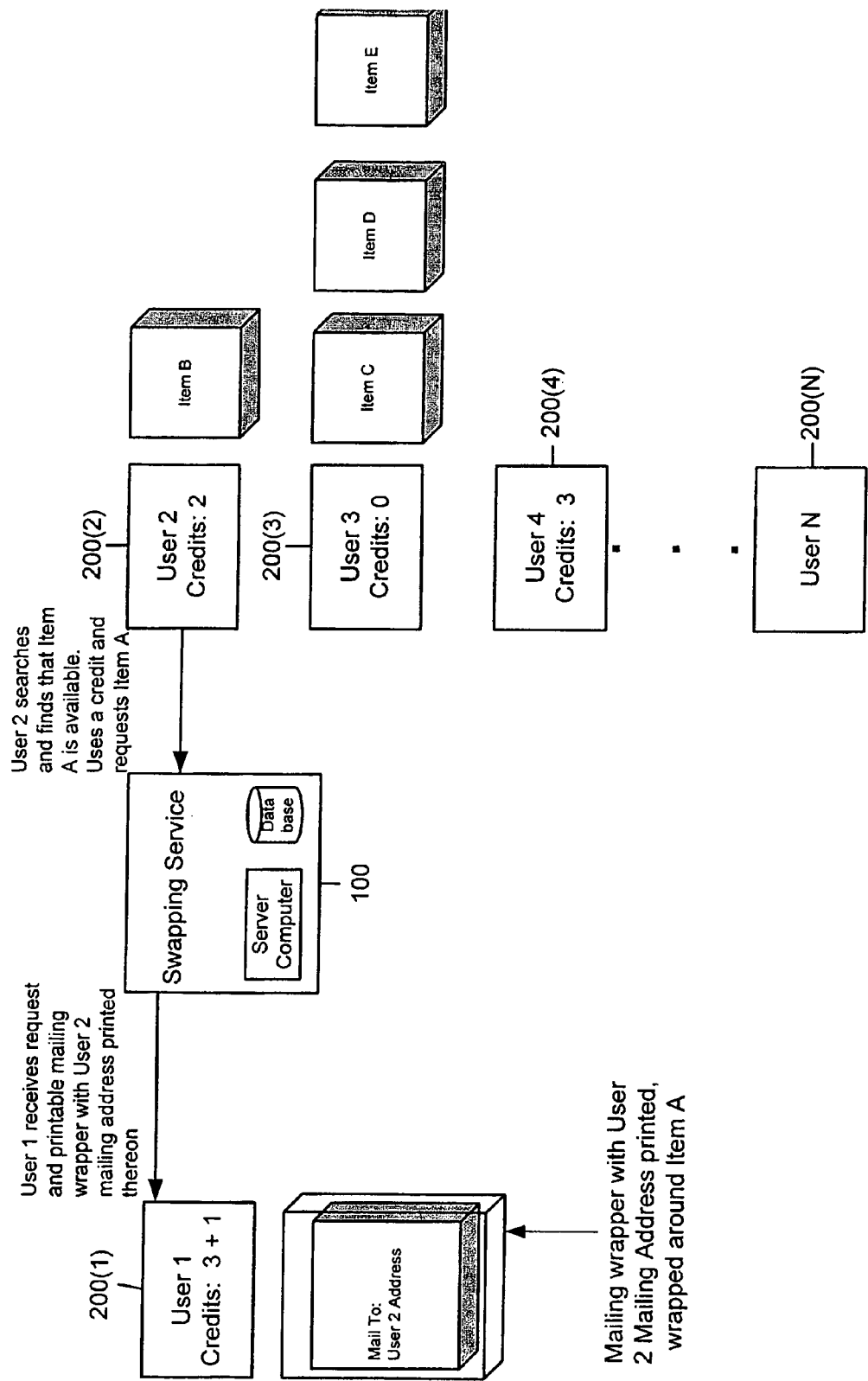
FIG. 2 is a flow diagram generally showing an operation of the swapping service.

Referring first to FIGS. 1 and 2, a swapping service is depicted that may be used to swap items of any type between user's that have registered with the swapping service. Examples of items that may be swapped with the swapping service described herein are paperback books, hardback books, music CDs, movie/video DVDs, etc. Generally, this system is useful to facilitate swapping of any item where the item value is less than a subscription or membership fee charged to members. However, even this value limitation may not be necessary if the swapping transaction is secured by a credit instrument, such as a credit card. Some basic concepts of the swapping service and system are described. A swapping service 100 manages trades or exchanges of items between users or subscribers (also called members) 200(1) to 200(N) to the service. The service collects a membership or subscription fee from members in exchange for providing the service that enables members to swap items. The fee may be collected on an annual basis, for example, or a monthly basis. Unlike existing trading systems, the items generally are not inventoried by the swapping service but rather stay in the possession of the respective users. Thus, the inventory is kept in the possession and control of the individual members of the club, removing the burden of the service to store inventory. Each user registers with the swapping service 100 and receives some initial credits for requesting items from other users. A credit is used and exhausted by a member when he/she requests an item from another user. On the other hand, a user that delivers an item to a requesting user earns a credit for doing so. Users may list their items available for trading/swapping with the service so that other users may find and request them. For example, user 1 has item A and user 1 provides information to the system that identifies item A. Examples of this identifying information are described hereinafter. Similarly, user 2 has item B and lists it with the service, and user 3 has items C, D and E and lists them with the service.

According to one aspect of the swapping service, when one user desires an item of another user, it requests the service to have the item sent to the requesting user. For example, if user 2 requests item A from user 1, user 1 would receive a notification, such as an email, that contains a printable shipping wrapper or label that includes the mailing address of user 2, and user 1 uses the mailing wrapper to mail or send item A to user 2. User 2 need not ever be made away of the identity of user 1. User 1 earns a credit when he/she ships item A to user 2. Alternatively, user 2 may request that item A be shipped to a third party who is not a user with the system, such as in the case where user 2 desires to send item A as a gift to a third party. In either case, the sender of the item bears the cost of shipping the item, but receives a credit with the service upon receipt of the item by the other party. There are no transactions charges to the sending member or receiving member for use of the service. The system issues a credit to the shipping member (e.g., user 1) when the receiving member or third party logs into the system and confirms receipt of the item. Alternatively, a particular technique described hereinafter may be employed to automatically determine when a shipment was successful received without requiring a party to log into the system and confirm that event.

According to another aspect of the swapping service, a technique is provided for managing credits (used to obtain an item from another user) is described herein, and for initializing each new user with credits to maintain the continuity of the swapping service. Shipment of one item by a first member to a second member results in the first member receiving credit, such as a single credit, per item shipped. Members are free to make an unlimited number of transactions per a given subscription term, subject to the number of credits each member has available.

The service may be hosted on a server computer connected to the Internet. Data for operating the service is stored in an electronic database, either local to the server computer or remote.

Figure 3:
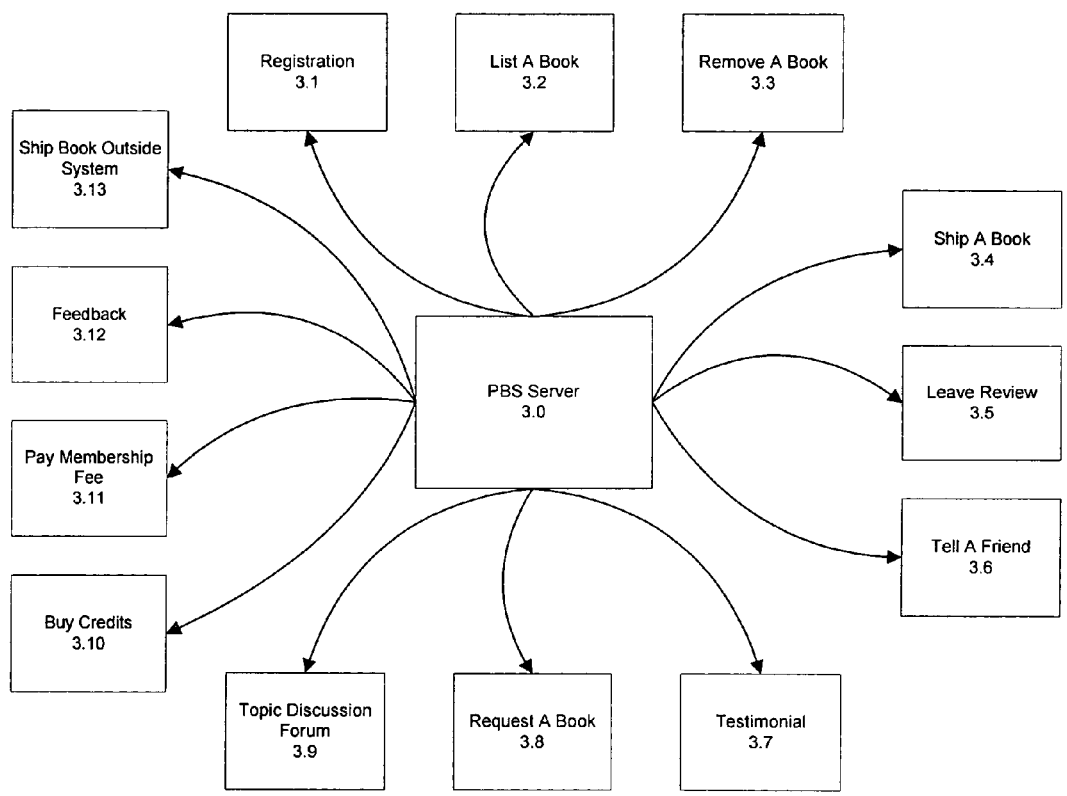
FIG. 3 is a diagram showing the main functions of the swapping service.

FIG. 3 illustrates some of the high level functions of the swapping service performed by the swap server 3.0, comprising Registration 3.1, "List a Book" 3.2, "Remove a Book" 3.3, "Ship a Book" 3.4, "Leave Review" 3.5, "Tell a Friend" 3.6, "Testimonial" 3.7, "Request a Book" 3.8, "Topic Discussion Forum" 3.9, "Buy Credits" 3.10, "Pay Membership Fee" 3.11, "Feedback" 3.12 and "Ship Book Outside System" 3.13. Data from users is obtained through forms presented through a user interface common to Internet web sites. Other features of the system that are, for simplicity, not shown in FIG. 3, are described hereinafter as well.

Figure 4:
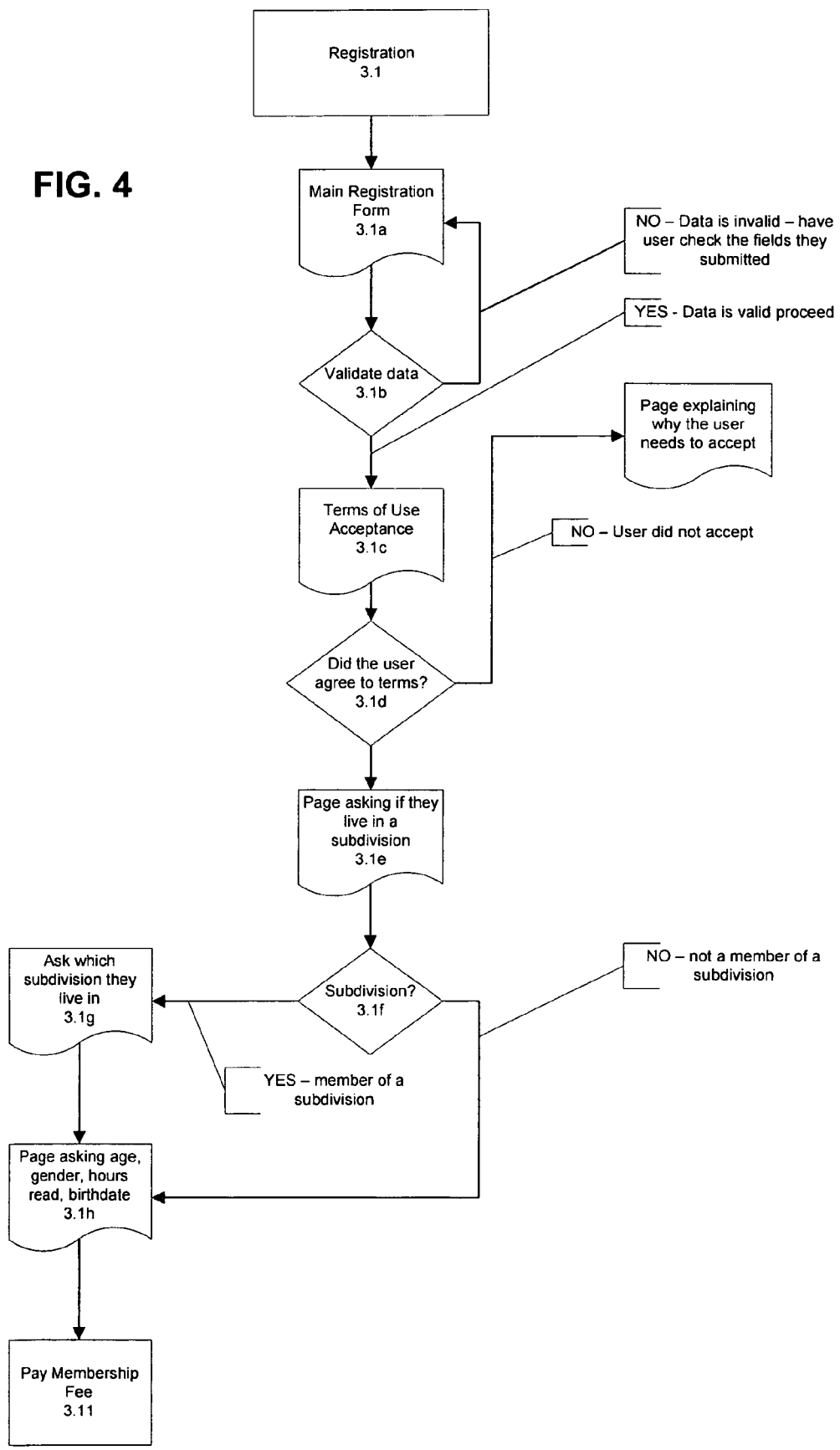
FIG. 4 is a flow chart showing the registration function of the swapping service.

FIG. 4 illustrates the Registration service. In step 3.1a, a main registration form is presented to a user into which a user enters data sufficient to register the user with the system, including home address, email address and other relevant data. The user data is validated as being sufficient in step 3.1b, and then in step 3.1c, a terms-of-use statement is presented to the user that the user must click to accept in step 3.1d in order to proceed. In step 3.1e, the user is presented with a page that asks whether the user lives in a certain geographic area (such as a subdivision), for reasons explained hereinafter. If so, then in step 3.1g, the user is asked to enter the name of the defined geographic area. Other user data may be obtained in step 3.1h, and then in step 3.1l, the user is asked to submit payment for the membership or subscription fee. This could also occur in reverse order as well.

Figure 5:
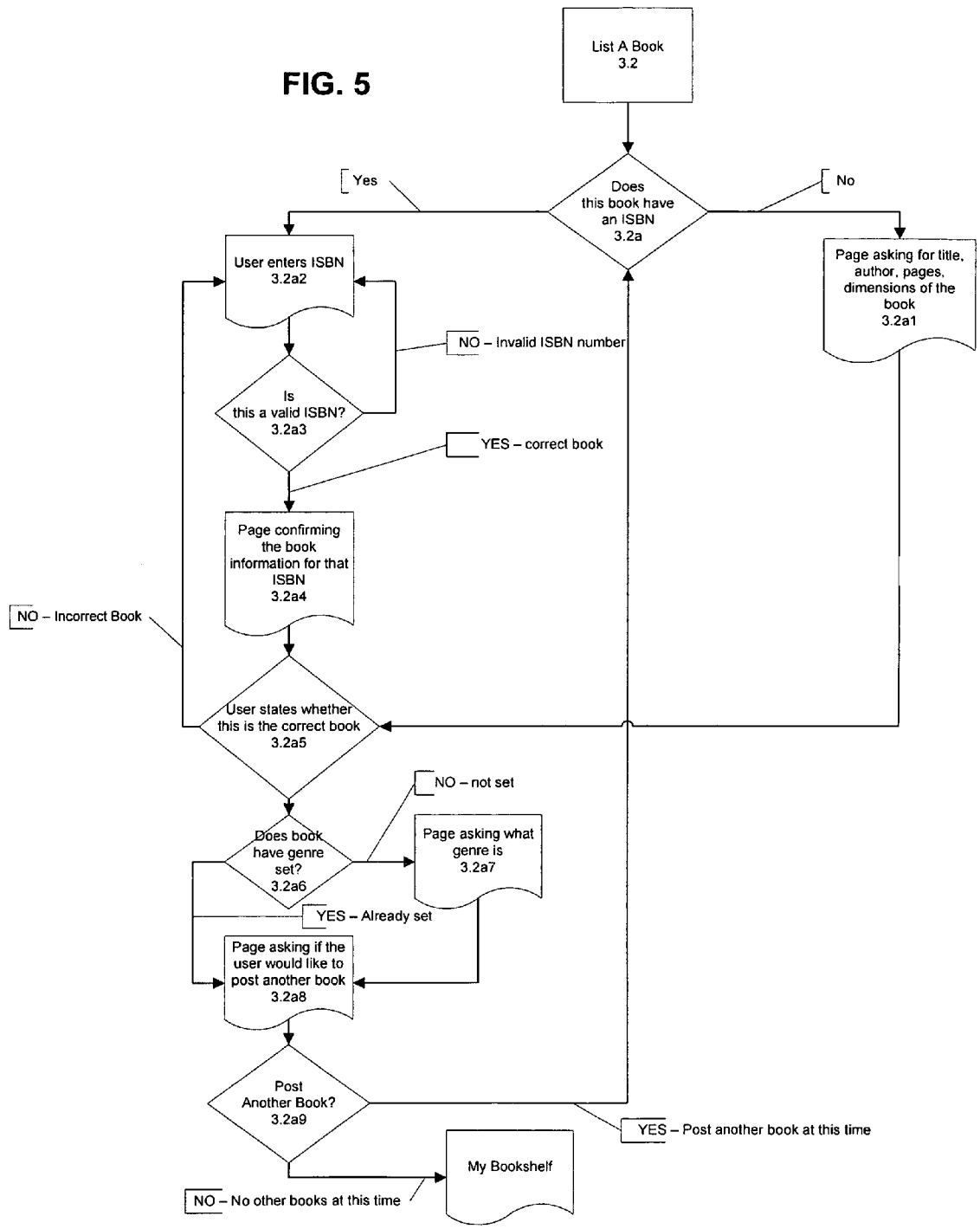
FIG. 5 is a flow chart showing the procedure for listing an item with the swapping service.

FIG. 5 illustrates the List a Book function 3.2, invoked when a user desires to list an item to be made available for trade, where the item to be listed is, for example a book. Most books have unique identifiers called an ISBN, which is a standard numbering system for books according to the International Standard Book Number Agency. In step 3.2a, the user is prompted whether the book has an ISBN. If so, the procedure continues to the left side of FIG. 5. In step 3.2a2, the user enters the ISBN for the book and in step 3.2a3, the system determines if it is a valid ISBN. If so, then in step 3.a4, a page is displayed to the user confirming the information for that ISBN so that the user can indicate whether it is the correct book in step 3.2a5. Next, in step 3.2a6, the system determines whether the corresponding book has a set genre associated with it. If so, the system stores that genre information, and if not, in step 3.2a7, the system displays a page asking the user to enter genre information for the book. Then, in step 3.2a8, the user is asks whether he/she wants to enter additional books, and if so, the process continues from step 3.2a. If not, the process continues to a page that displays a list of the books that user has listed, called the My Bookshelf page/function.

Figure 6:
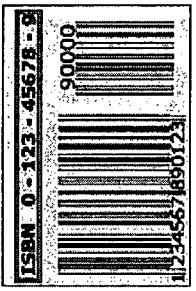
FIG. 6 is an exemplary display of a page useful for listing an item with the service.

When, in step 3.2a, it arises that the book does not have an ISBN, then the system presents a page that asks the user to enter the title, author, pages, and dimensions (width, height and thickness) of the book in step 3.2a1, and then the process continues to step 3.2a5, described above. The system uses the item information to calculate the postage amount required by the member who is requested to send the item to its destination. For example, it is possible that some items of like kind have different dimensions (e.g., different number and/or size of pages of a book, or multiple volume CD or DVD works, etc.) The item may be sent by conventional postal services, or by other shipping services such as UPS or Federal Express, in which case depending on the type of delivery service, the corresponding approximate shipping fee is computed by the swapping service. In addition, the system will automatically find the U.S. or other (non U.S.) postal zip code (plus 4) digits and include that information, as well as the U.S. routing barcode symbol in the print data for the book wrapper. The system may also include a tracking number to allow the requesting member and sending member track the item during shipment. This feature and an automatic delivery confirmation feature are described hereinafter. The system may retrieve the book information based on an ISBN input by a member. One way to do this is to use a dedicated ISBN database, which is commercially available. FIG. 6 illustrates an example of what a List a Book web page may look like, and FIG. 7 illustrates an example of the My Bookshelf page, where three books have been listed by a particular user.

The system builds a database of items available for swapping on a first-in first-out (FIFO) basis. As a result, if more than one member lists the same item, the member who listed that item first in time will be offered an opportunity to ship that item to the requesting member. Thus, the member who is first to list is the first to ship and therefore the first to receive a credit. This encourages members to promptly list any items that they have and also makes it fair to other members who list their items promptly by awarding them the chance to earn the credit before other members. This FIFO policy may be further refined and performed on a geographical-basis (regional, state or city). For example, the system may examine the database to identify the member located in a particular region (East Coast, West Coast, Midwest, etc.) that first listed the item. This can help achieve faster delivery times.

Figure 7:
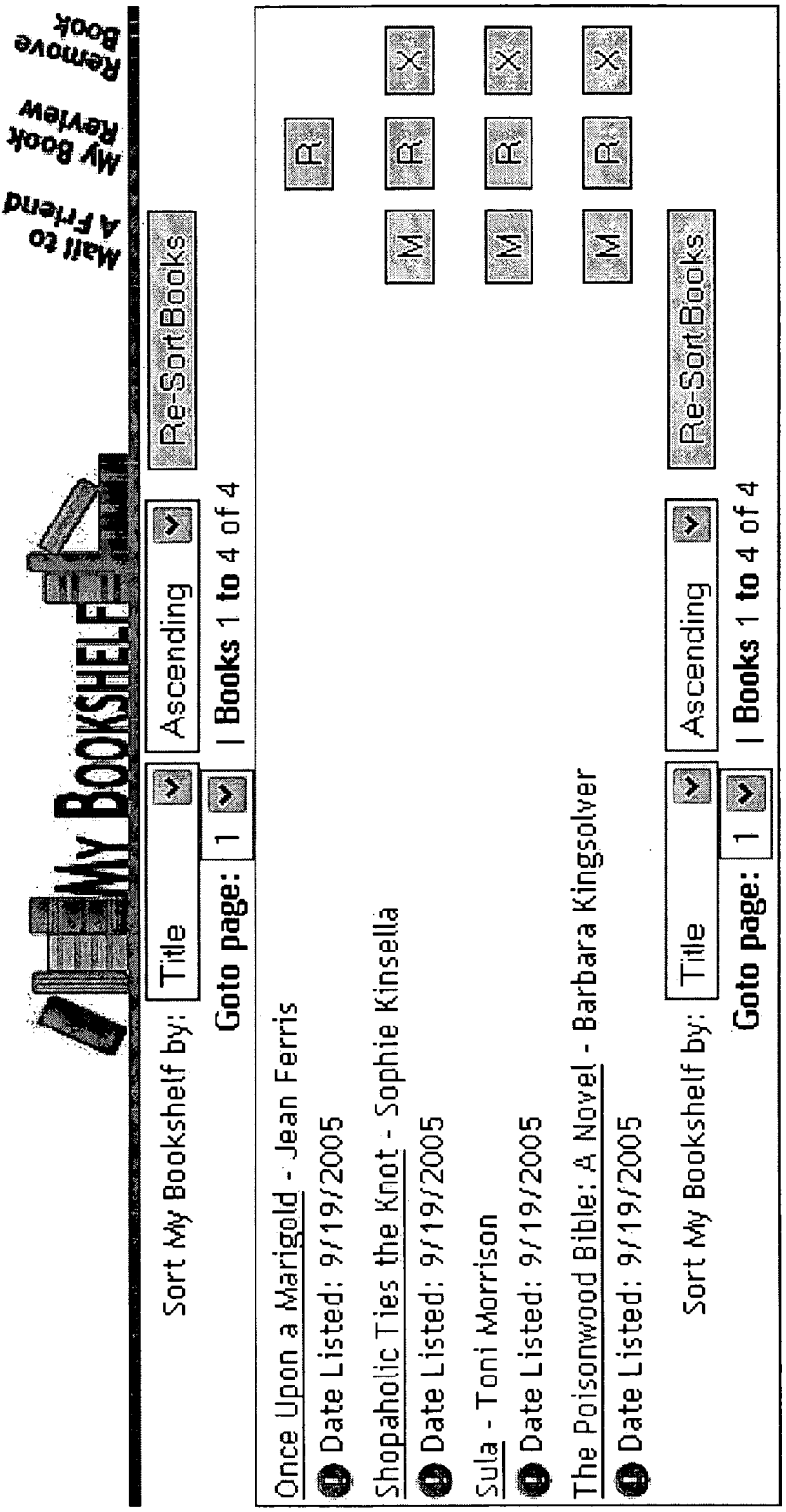
FIG. 7 is an exemplary display of a page useful for viewing items listed with the service by a user.j

There is a "Remove Book" icon that can be selected from the My Bookshelf page as shown in FIG. 7. The Remove a Book function 3.3 presents a page with details of the book that a user has selected for deletion. After removing a book, the user is returned to the My Bookshelf page.

Figure 8:
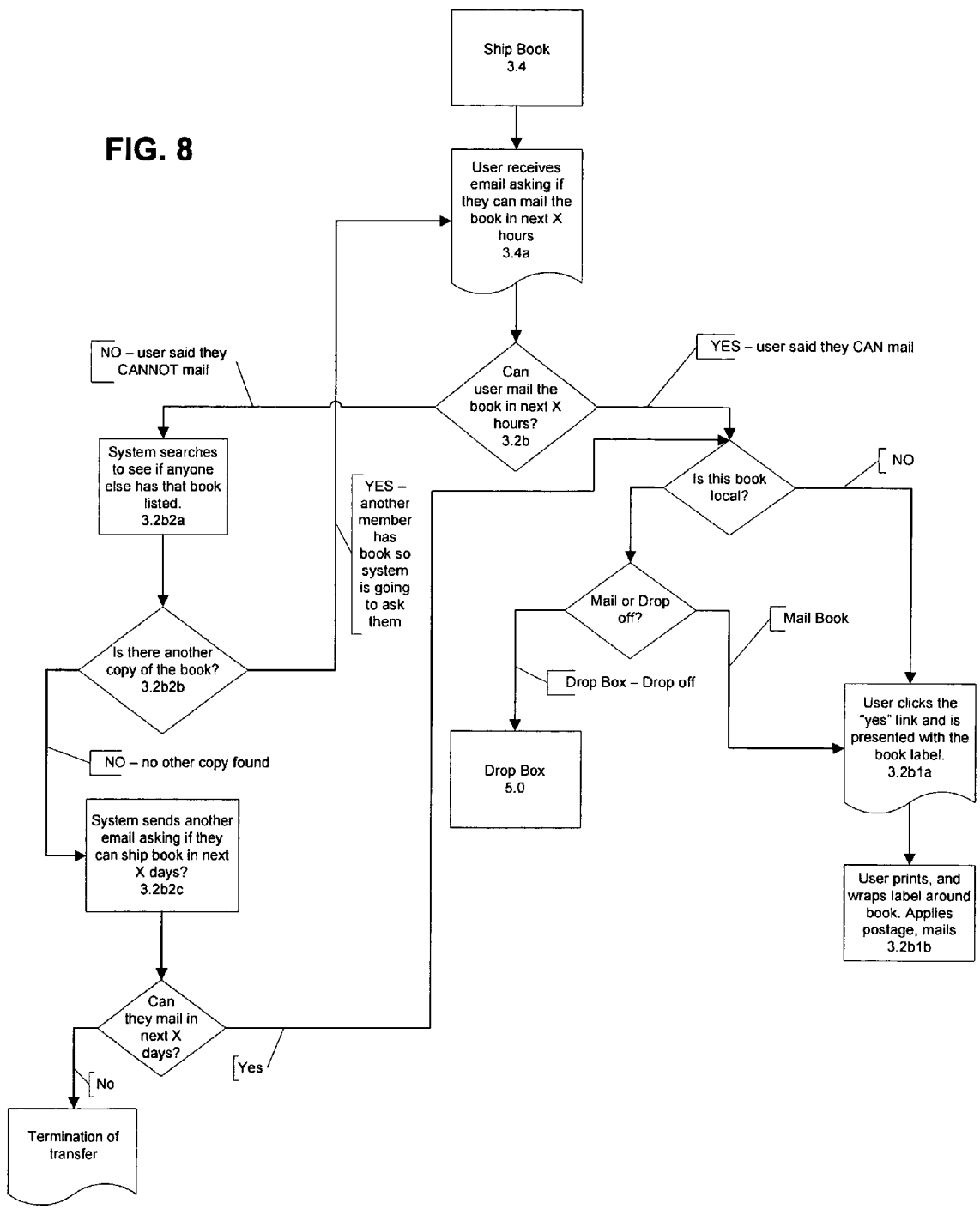
FIG. 8 is a flow chart of a procedure for assisting a user to ship an item requested by another user.
Figure 9:
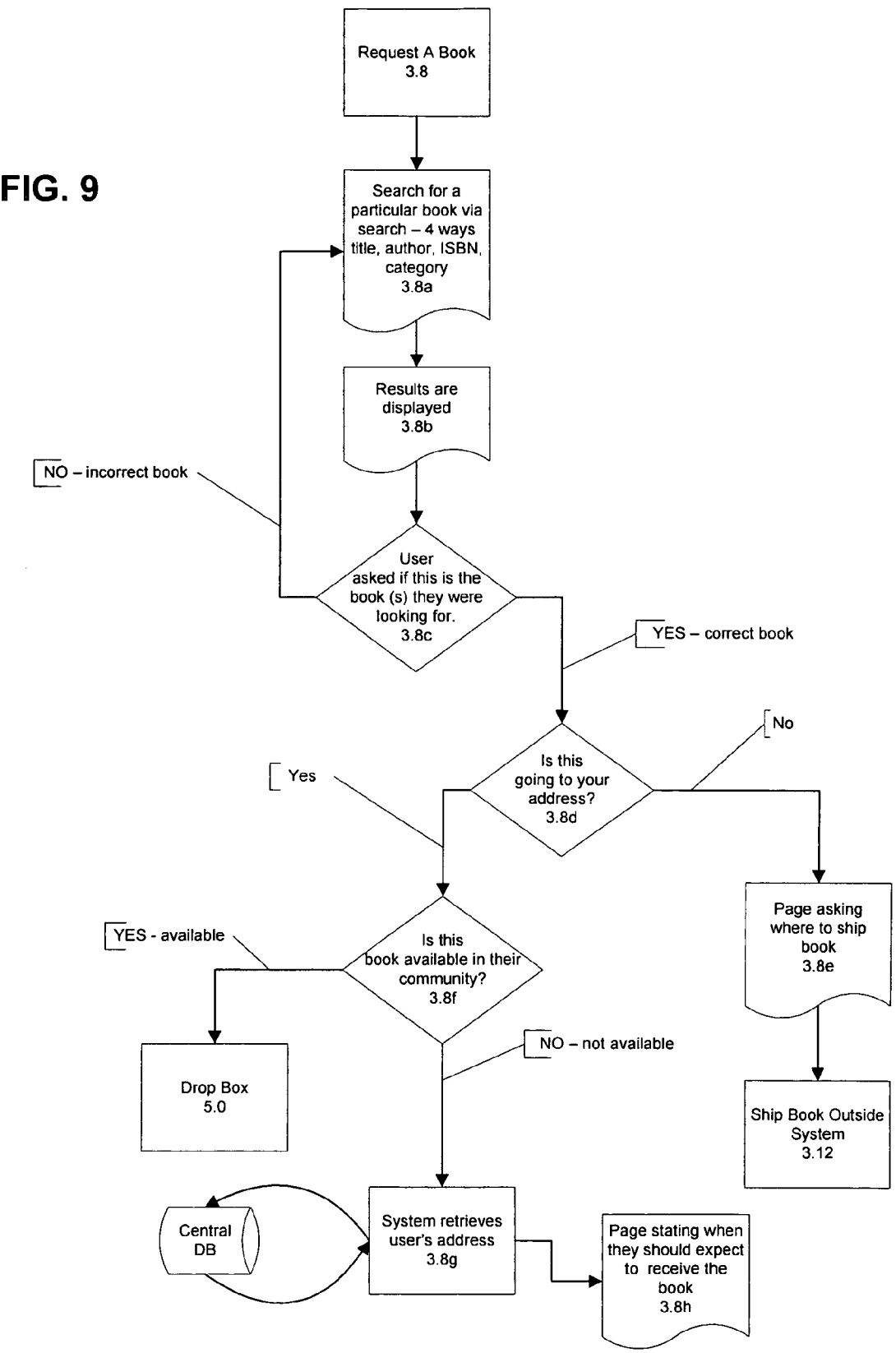
FIG. 9 is a flow chart of a procedure for requesting a particular item for shipment.

FIG. 8 illustrates the flow chart for the Ship Book function 3.4. In step 3.4a, the system sends an email message to a first user having in his/her possession an item requested by a second user. The email may ask the first user if he/she can mail the item (e.g., book) in the next X number of hours. For example, in one embodiment, the email message sent by the system to the first user may contain an embedded link that, when selected, logs the first user into the service's web site without the first user having to enter a user name and password. More specifically, the system may include in the embedded link in the email message a predetermined alphanumeric security code that, such that when the link is selected, the system can retrieve that alphanumeric security code to verify its authenticity and allow the first user into the service's web site without user name/password verification. In any even, if the user indicates, once on the web site, that he she can deliver the item, the process then proceeds to the right side of FIG. 8 where the system determines if the first user lives or resides local (short driving distance) to the second user. If so, then the first user can decide to mail the item to the second user or drop the item in a drop box according to a Drop Box function 5.0 described hereinafter.

If the users are not local to each other or the shipping user wishes to mail the item, then in step 3.2b1a, the first user would click "yes" in a link in the email that presents the user with a mailing wrapper (in the form of a PDF or other suitable document format) with the second user's mailing address already printed on it. In step 3.2b1b, the first user prints the document and wraps the mailing wrapper around the item, applies postage, and mails the item to the second user. It is important to note that the mailing wrapper document is formatted such that it can be printed by a standard computer printer using standard size paper, yet when used as instructed, essentially serves as a pre-addressed mailing envelope.

Figure 15:
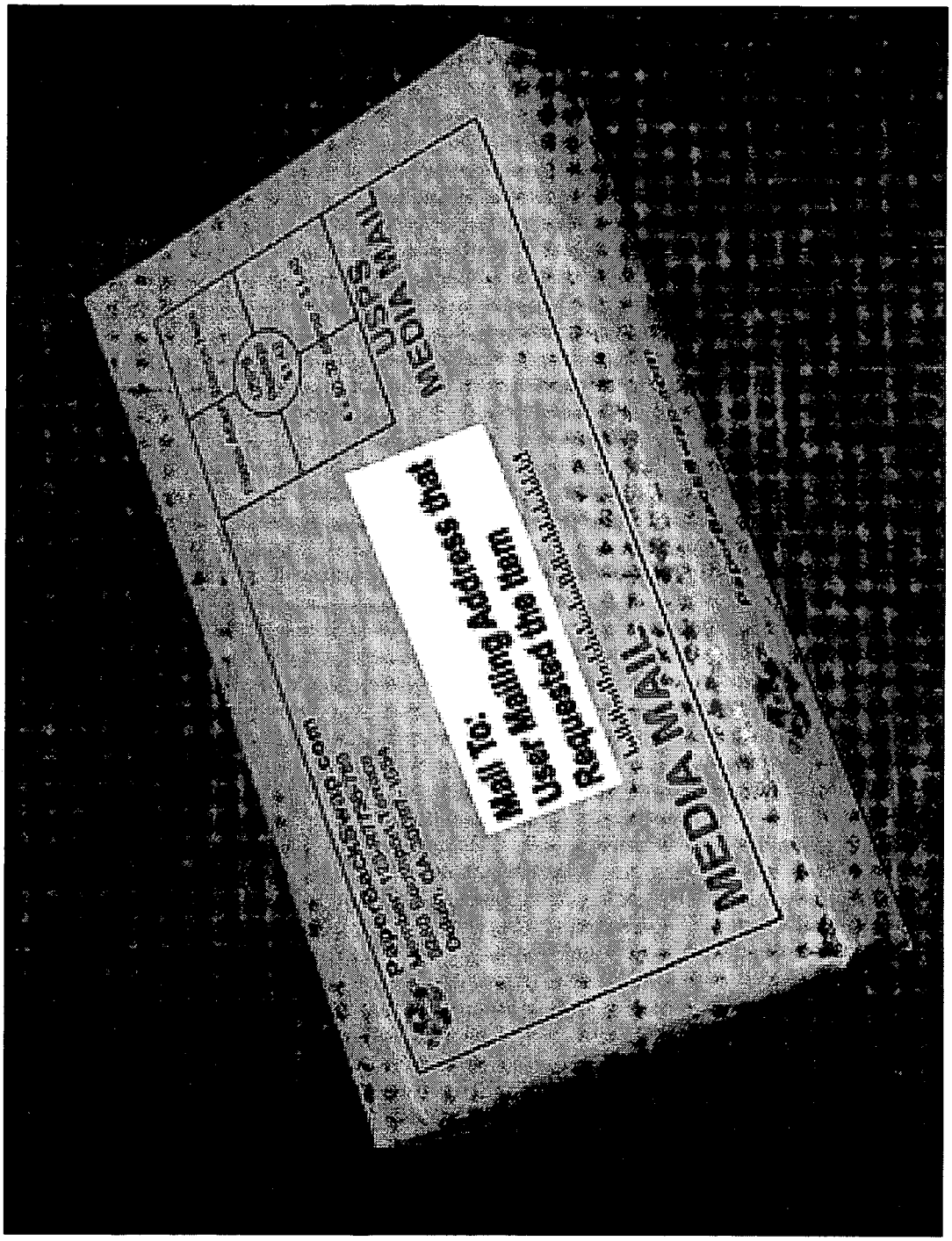
FIG. 15 is an image of the mailing wrapper placed around a book ready for mailing.

If, in step 3.2b, the user with the requested item indicates that he/she cannot mail the item within the specified period of time, then in step 3.2b2a, the system searches to see if another user has listed that same item. If so, then the process proceeds to step 3.4a where that other user with the same item is prompted as indicated in FIG. 8. If in step 3.2b2b the system determines there is no other copy of the book available (other than the first member determine to have listed the book, but can't ship it within the next X hours, no other member has listed it), then the system in step 3.2b2c sends another email to the first member in possession of the requested item to inquire if he/she can ship the book with a longer period of time, e.g., 5 days. If so, then the process continues to the right side of FIG. 8 where the user is either prompted to drop the item in a drop box, or is supplied with mailing wrapper data for print. An example of a mailing wrapper is shown in FIGS. 14 and 15 described hereinafter, together with uses and advantages of the mailing wrapper. If that first member who has the listed item cannot ship it even with the longer period of time, e.g., 5 days, then the process terminates the ship book function, and informs the member requesting that item that it is not available.

To summarize the procedure of FIG. 8, if a first member determined to have listed a requested item cannot ship the book within a first relatively short period of time, the system will determine if there is another member who has listed that book and can ship it within the second relatively short period of time. If no other member has listed the book or if that other member cannot ship it within that period of time, the system will go back to the first member and determine whether he/she can ship it within a longer period of time. This process may be performed in any order, the main concept being that the system searches for the member that has listed the requested item and can ship it the soonest. This will be the member that will first get the opportunity to earn a credit by shipping the item to a requested user. The system will look for another member who has listed the same item in the event the first member contacted cannot deliver the item (within some prescribed period of time), and if no other member has listed the same item, the system will terminate the order.

An important aspect of the Ship a Book Function is that the system includes the mailing address of the party to receive the item (either another member or a person not a member to the service) without requiring that the mailing member know the recipient party to receive the item, or to have consummated a transaction with the requesting member. The service merely finds the member who has a particular item requested by a requesting member, and provides the mailing address needed by the member with that item to mail the item either to the requesting member or another party designated by the requesting member. To reiterate, the member with the item, the member requesting the item, and the party who is to receive the item need have no contact with each other (and therefore no exchange of personal or other information) in order to consummate the transaction, except to the "mail to" address. The service handles all of this in the background.

The Leave Book Review function 3.5 allows a user to leave a descriptive review of a particular item (e.g., book) for other users to read in helping other users to select a particular book through the swapping service. In addition, this function may permit a user to enter a rating of the book on a scale of 1-10.

The Tell a Friend function 3.6 permits a user to enter email addresses of other persons that may be interested in the swapping service. The swapping service sends an email message to those persons, together with an introduction to the service.

The Testimonials function 3.7 presents a page to a user and prompts a user to comment on the swapping service itself, with permission to use that comment as a publishable testimonial about the service for marketing purposes.

With reference to FIGS. 9 and 10A, 10B and 10C, the Request a Book function 3.8 will be described. In step 3.8a, a user is presented with a page, such as the one shown in FIG. 9, which allows a user to search for a particular item, e.g., book in several ways, including title, author, ISBN, or subject matter category, publisher, publish date, key words in book description, large print, audio books, hardcover vs. paperback, and genre. In step 3.8b, the results of the search are displayed on a page to the user. In step 3.8c, the user is asked if the book(s) listed are the ones he/she is searching for. If so, then in step 3.8d, the user is asked if the item should be shipped to the user's address, or an alternate address. If it is to be shipped to an alternate address, a page is presented in step 3.8e that asks the user to enter the address of where the book is to be shipped. If it is to be shipped to the user's address, then in step 3.8f, the system determines whether that particular book is available (from the other user who has it) in the requesting user's community. If so, then, the process proceeds to the Drop Box function 5.0. Otherwise, the process proceeds to step 3.8g in which the system retrieves the user's address and then in step 3.8h the system displays a page that indicates to the requesting user when they should expect to receive the book. At this point, the requesting user essentially gets confirmation that the book he/she requested will be delivered, and particularly when he/she can expect to receive delivery of it. The user who has that book will be contacted by the system according to the process described above in connection with FIG. 8. When, in step 3.8e, a user enters a shipping address for a person who is not a member, subscriber or user with the swapping service, then the process continues to the Ship Book Outside System function 3.12, described hereinafter in conjunction with FIG. 12.

Figure 10A:
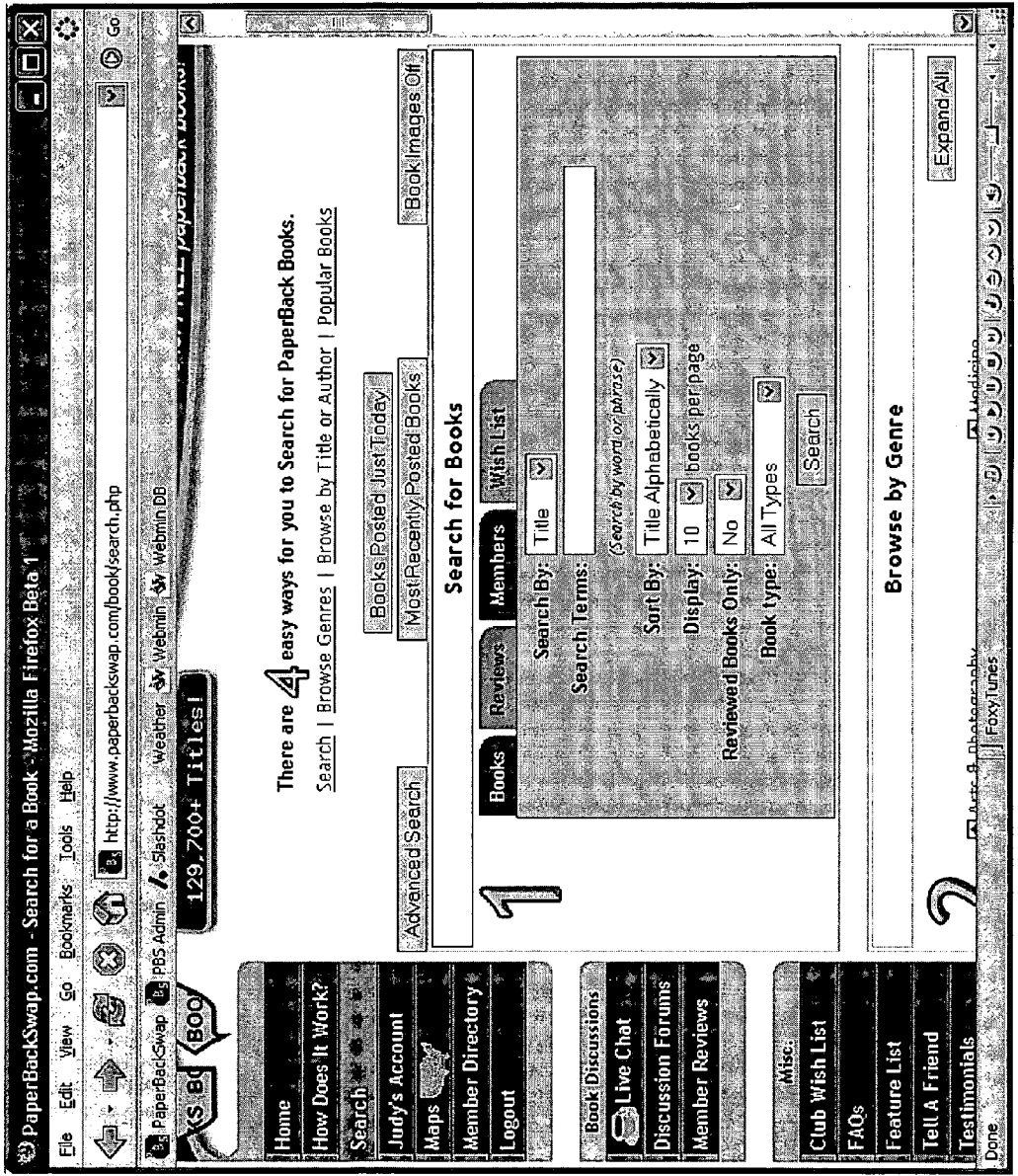
FIGS. 10A, 10B and 10C are portions of an exemplary web page useful for searching for a particular item listed with the service.
Figure 10B:
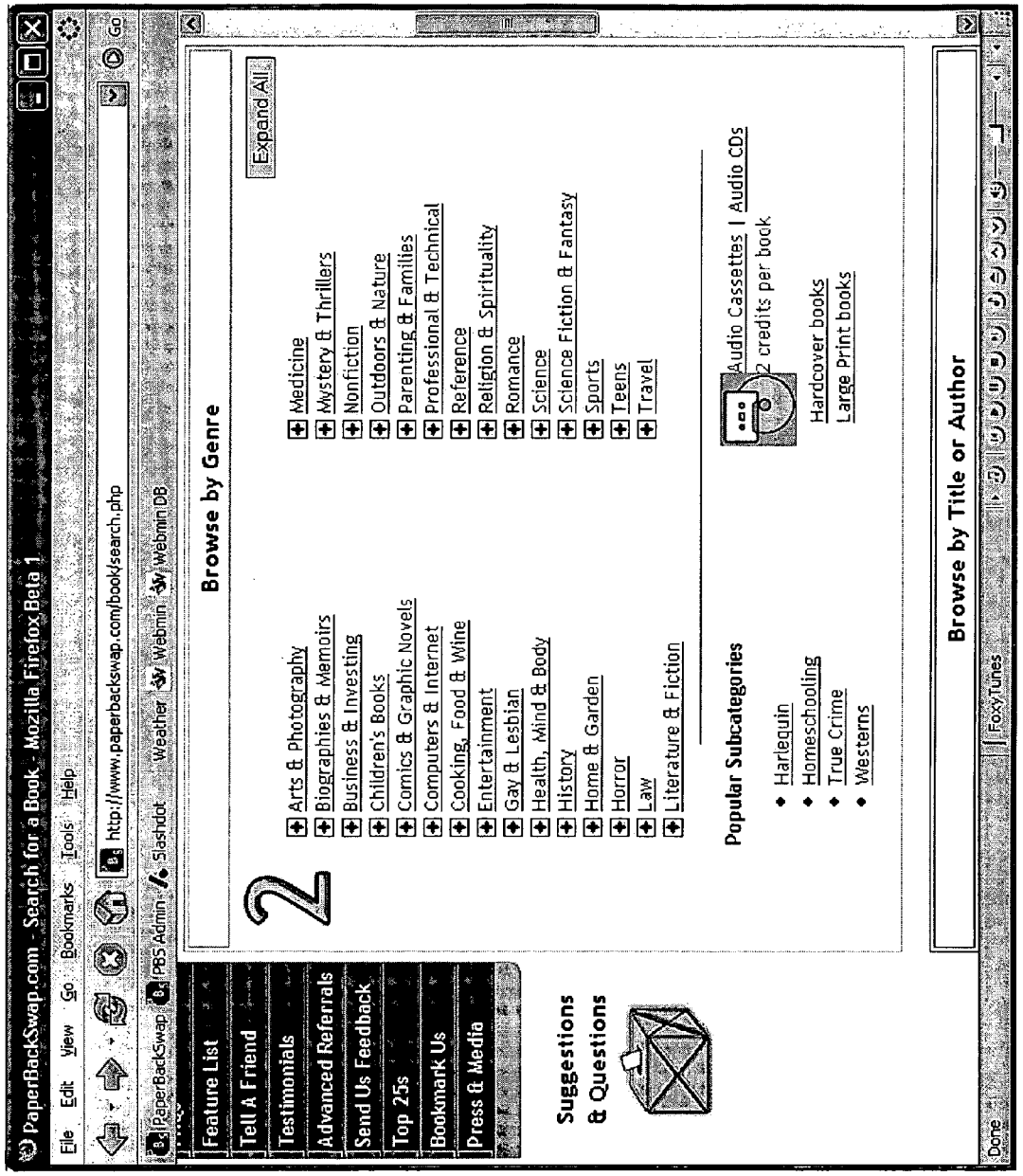
Figure 10C:
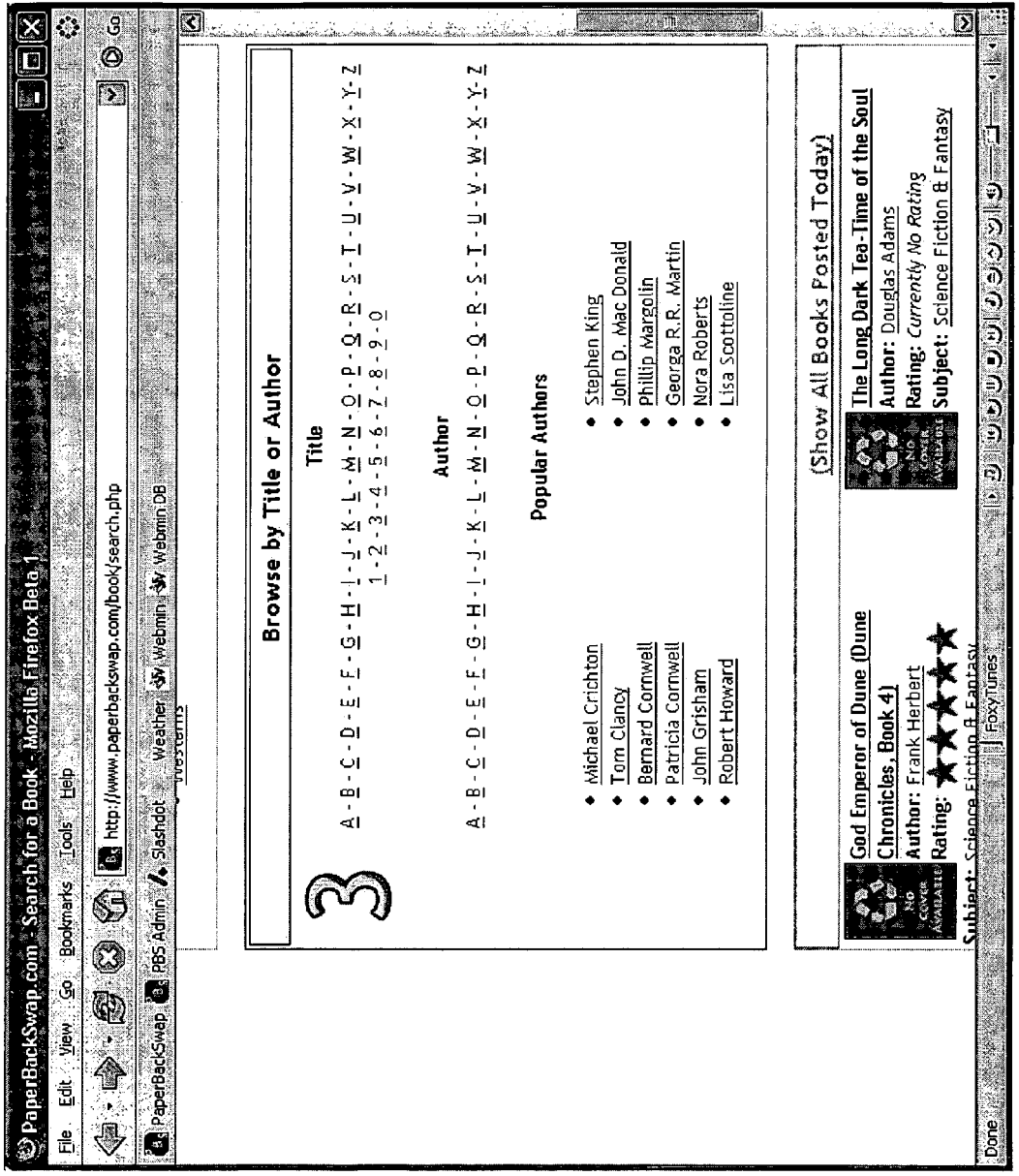
Figure 10D:
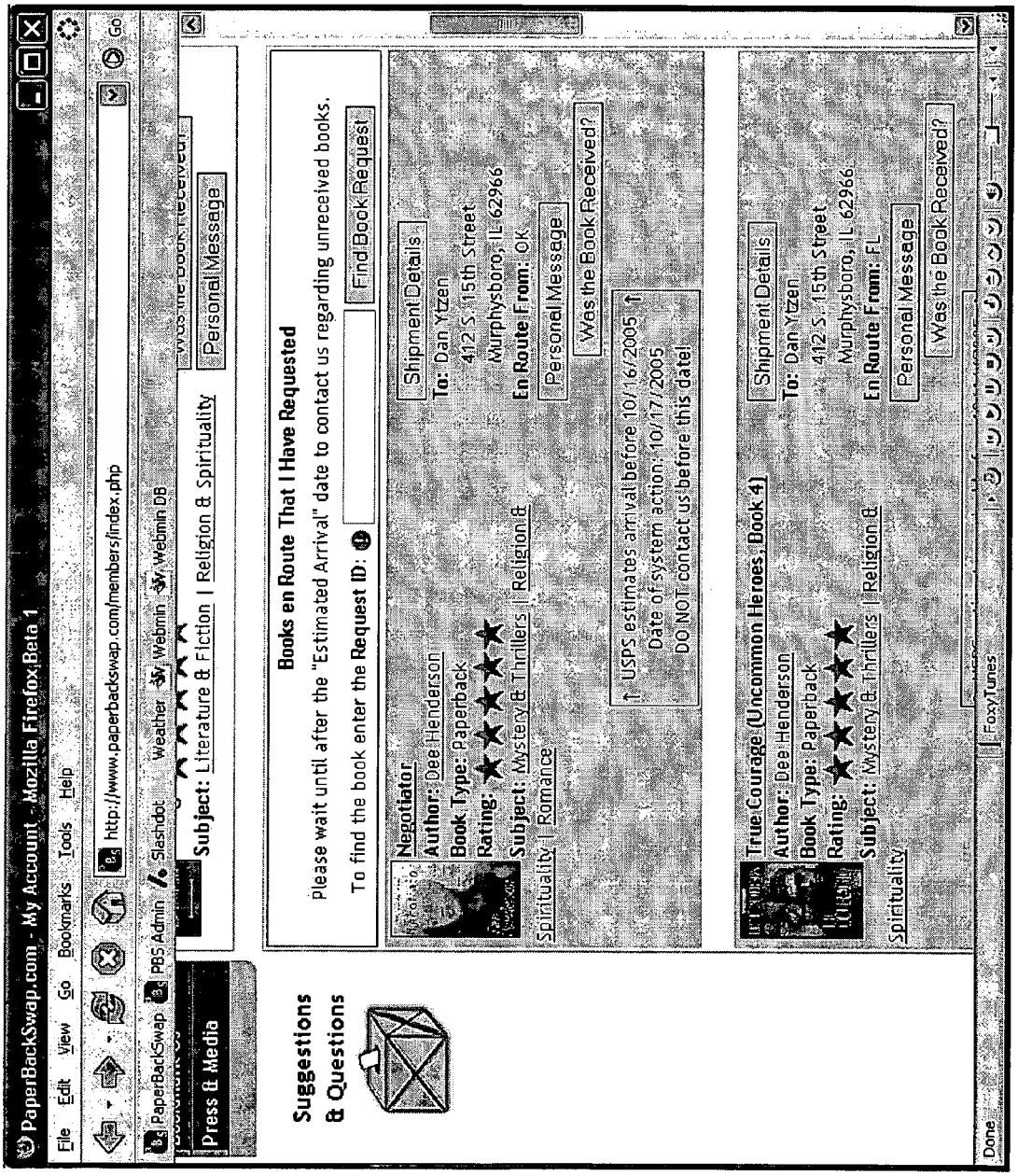

When a party (member or non-member) receives an item shipped from a member, text printed on the shipping wrapper instructs that person to log onto the web site for the service to confirm their receipt of that item. FIG. 10D illustrates an example of a screen that may be displayed after a member has requested or ordered an item from another member. This screen may be displayed each time the ordering member logs into the system, and once the item is received, that party may click the button "Was the Book Received" or may click on this button in the event the book is not received by the estimated delivery date. If the receiving party is another member with the service, then that member may also be prompted to automatically repost that item with the service after a user-selectable period of time, or to not automatically repost that item.

Another feature that the swapping service may provide is to allow a member to enter information about an item that is not currently available. The system will monitor new items listed with the service, and when it becomes available, the system may generate an email that is sent to the member advising of the availability of the item, or may display a notice to the member when the member logs into the system.

The Topics Discussion Form function 3.9 allows users to select a particular topic, or enter a new topic not already listed, to enter an on-line discussion or chat about a particular topic, with other users.

Figure 11:
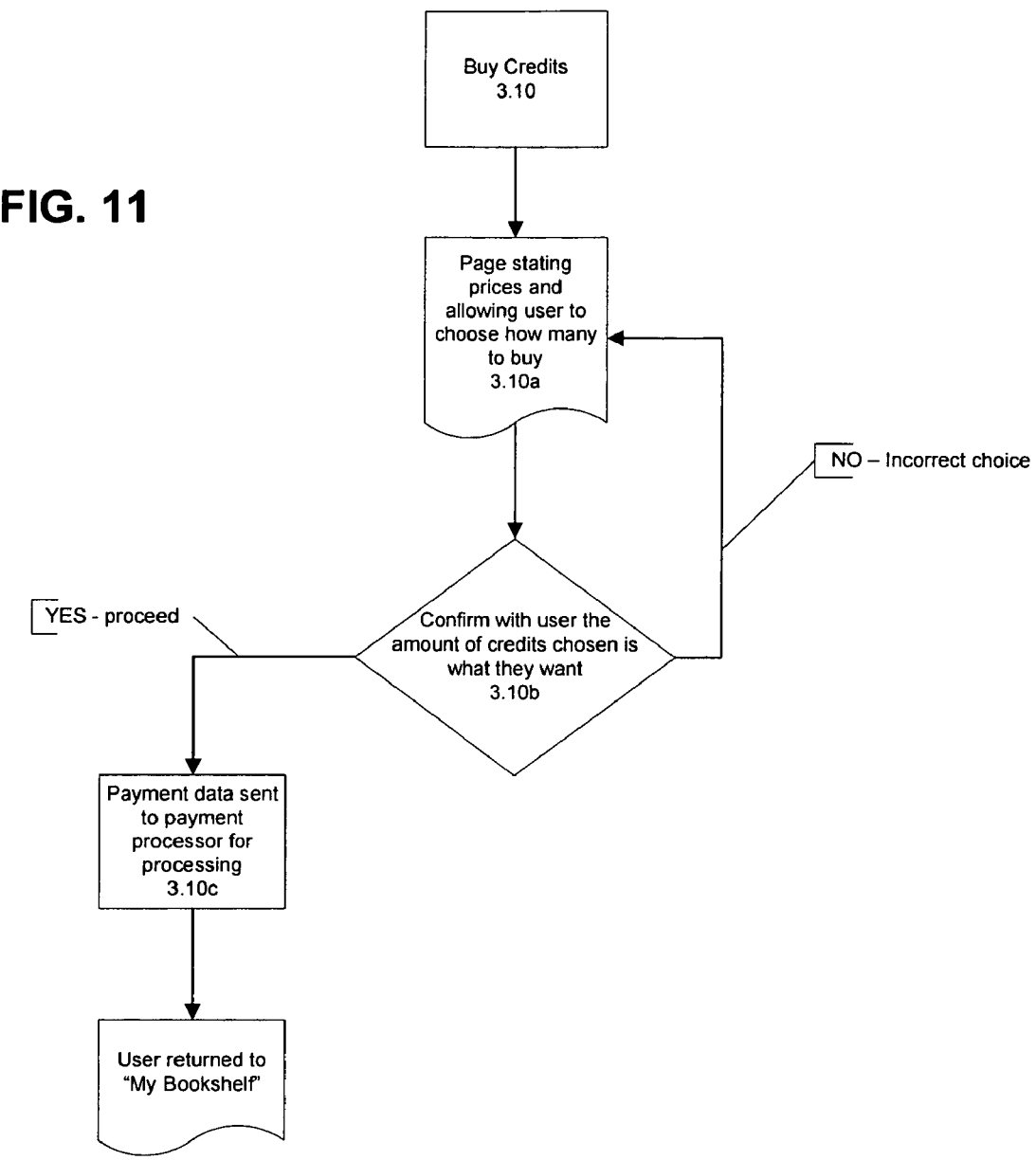
FIG. 11 is a flow chart of a procedure for purchasing credits with the service.

The Buy Credits function 3.10 is depicted in FIG. 11. This function may be invoked by a user when the user has exhausted his/her credits by requesting books from another user. A credit initialization scheme is described hereinafter. In step 3.10a, a page is presented to a user that states the prices for credits and allowing the user to choose how many credits to buy. In step 3.10b, a page is displayed that confirms to the user the amount of credits chosen for purchase, and if the user confirms this, then in step 3.10c, payment data is sent to a payment processor for processing. At the completion of this function, the user may be returned to the My Bookshelf page.

Figure 12:
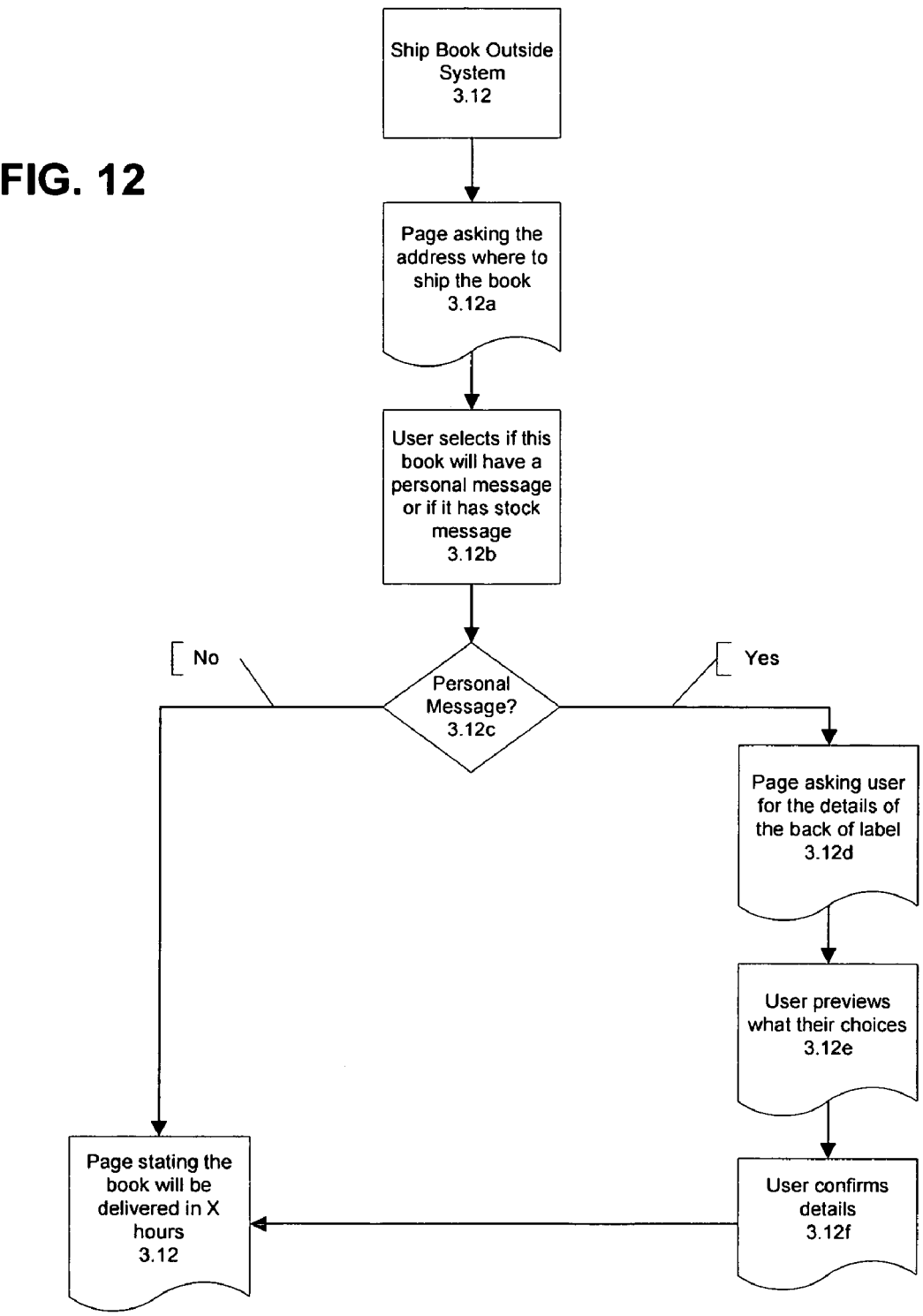
FIG. 12 is a flow chart of a procedure for shipping an item to a person who is not registered with the service.

FIG. 12 illustrates the Ship Book Outside System function 3.12. It is invoked when a user directs the system to ship a book to an address for a person who is not a user or member of the service. In step 3.12a, a page is displayed that asks the user to enter the address for shipment of the book. In step 3.12b, the user is prompted to select whether the item should be shipped accompanied by a personal message or with a standard message. If the user selects for a personal message to be used in step 3.12c, then in step 3.12d, a page is presented asking the user to enter the personal message that is to be printed on the back side of the mailing wrapper. In step 3.12e, a page is presented that shows/previews the personal message for the user. And in step 3.12f, the user confirms the message and it is stored and used for entering onto the mailing wrapper. When, in step 3.12c, the user selects a standard message, then in step 3.12g, a page is presented that states when the user can be expect the item to be delivered.

Figure 13:
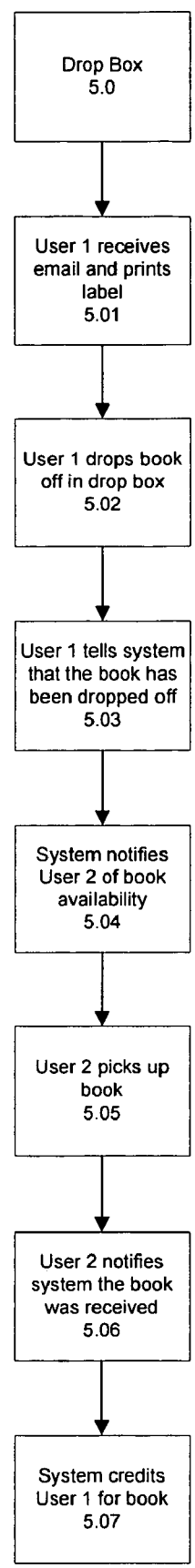
FIG. 13 is a flow chart of a procedure for delivering an item to a drop box for delivery to a user, rather than shipment through the mail.

FIG. 13 illustrates the Drop Box function 5.0. This function is invoked when a user decides that a book can be delivered to him/her locally without use of the mail by depositing the book in a "drop box" that has been set up in a locale that is convenient to the user requesting the item and the user delivering the item. There may be many drop boxes set up in various towns and cities that are associated with the swapping service. The drop box may be equipped with a coded lock or safe and the code is provided only to members that require access to it for depositing an item or retrieving an item. For purposes of this discussion, user 1 is user that has the item and will make delivery of it to the drop box, and user 2 is the user that is requesting the item, and has also requested that it be delivered via the drop box, rather than mail. In step 5.01, the swapping service sends an email to user 1 that contains the printable mailing wrapper on which the name of user 2 is included. In step 5.02, user 1 takes the item, now wrapped in the mailing wrapper, to the local drop box and leaves it in the drop box. In step 5.03, user 1 logs into the system again and makes an indication with the system that the book has been dropped off at the drop box. In step 5.04, the system sends an email or other notification (while user 2 has an open session with the system) indicating that the book has been dropped off and is available. In step 5.05, user 2 picks up the book from the drop box. In step 5.06, user 6 logs into the system and notifies the system that user 2 received and has possession of the book. Then, in step 5.07, the system grants the credit to user 1 for making good on the delivery of the book.

As an alternative to a drop box, a truck or van may drive around various communities and stop at a particular location to allow members to drop off items and pick up other items. This would allow for verification by the person handling the truck or van to be sure only the authorized members can retrieve an item. The truck or van would then move to a location in another community and do the same. The schedule stops of the van would be made known to the appropriate member to allow them to conduct their transactions.

Still a further alternative is a PO Box type system where each member has their own key to their box. A vendor would sort the incoming items and place them for pick up in the boxes, much like the post office, but on site within a neighborhood.

Thus, as described above the drop box alternative may take the form of a box manned by a person who can authorize delivery of an item to the proper member or non-member, or an unmanned box.

Turning to FIG. 14, an example of a mailing wrapper document is shown. This document is created by the swap server 3.0 and sent by email or downloaded to a user in a convenient generic document format, such as the well known portable document format (PDF). It is easily printed by a user's printer. The document is pre-formatted such that when it is printed and applied to an item, such as a paperback book, the "mail to" and "return address" information is on one side of the item, and a specialized or generic greeting or message is on the other side of the item. In addition, a postage application position is also indicated, as well as the postage amount, on the side with the "mail to" and "return address" information. FIG. 15 shows the mailing wrapper placed around a book. The edges of the wrapper are folded and taped, and the book is thereby made ready for mailing.

An additional document can be created onto which the system prints a more private message supplied by a member who is mailing an item to a recipient party. The second document may include instructions that indicate that it is to be placed inside the mailing wrapper document when applied to the item, such that the message created by the second member is not visible until the mailing wrapper is removed by the recipient party.

An automatic delivery confirmation feature will now be described. The US Postal Service (USPS) has a delivery feature that allows a user to obtain delivery confirmation that a package is successfully delivered to the recipient. The USPS assigns a tracking number to the package and prints a bar code or other machine-readable code on the package. When the postal carrier takes the item to the recipient's door or mailbox, he/she scans the package under a reader that reads the tracking number and associates that event with a a successful delivery to the recipient.

Further, the system may, as an optional or basic feature, link with the USPS (e.g., the USPS web site) to obtain a tracking number and then include that tracking number and associated bar code or other machine-readable indicia in the mailing wrapper document that is emailed to the member who is going to send the item. The system will also assign a request identification number to the item (or items) that will be shipped with that wrapper. Thus, when the shipping member mails the package with the tracking number indicia exposed, the USPS carrier will scan that data when delivering the package to the recipient's door or mailbox. The USPS will then have confirmation of the package's delivery and will email or otherwise transmit confirmation of this event to the system. The system will receive the email and extract the tracking number data and match it with the corresponding request identification number. Thus, the system will automatically know when the item(s) corresponding to that request identification number is/are received. Upon this event, the system can apply a credit (or credits) to the member who shipped the items. With this feature, the recipient member or other party need not log into the system to confirm their recipient of the item.

The automatic confirmation feature can also be used to allow sender and recipient to track movement of the item between origin and destination using the association between the tracking number or identifier and the request identification number. While this feature has been described in connection with the USPS, it may also be used in a similar manner with other carriers, e.g., United Parcel Service (UPS) and Federal Express (FedEx).

The following is a further explanation of the credit management aspects of the swapping service. Generally, a typical trade involves only people. They trade item X for Y and the transaction is complete. In the context of the swapping service, if there are two people who both wanted to trade one item for another item, this would describe this system. However, the process that we have is more complicated.

Take the following example:

Users 1, 2 and 3 are all members or subscribers to the service. Person 4 is not a member. At their respective registration with the service, users 1, 2 and 3 each lists 3 books. Person 4 is not even aware of the service yet.

Users 1, 2, 3 are all registered with the service. If user 1 and 2 get together, they can trade item for item. However, for users to swap books in the system, credits must be issued so that there is a "sharing" of books that would allow for a 3-way trade (user 3). But how can they swap books for credit if none of them have credits to start the system? There needs to be a way of "starting" the credits, and the credits must be "backed up" with like-kind items.

A solution is to issue some number of credits up front so that the trading can begin. For example, the system issues an initial 3 credits each to users 1, 2 and 3. It is possible that the users will have used all items in the system, but each still has credits. The system has depleted itself of items, and the users of the system still expect to get more items. Therefore the system is altered to allow for more books to enter the system. Recognizing the shortfall of 3 books per user who enters the system, books are added back into the system to balance the credits initially issued.

The following example and economics apply. By charging an annual subscription or membership fee, the service is able to buy books to replenish the system and to ship them to the users. For example, a used paperback book will cost the service a minimum amount depending upon where it is purchased. For each user who is issued 3 credits to register with the system, the system must "replenish" itself with 3 books to avoid the problem outlined above. This will give each user at least 3 books to select from.

Additionally, the system will have to ship each of the books (at the then current book rate shipping cost from the United States Postal Service). The system also covers handling charges and hard costs (e.g. paper wrapper and tape) for those books. Therefore the total costs associated with the books the system buys and may ship includes the cost of the book, the postage and the handling and hard costs, which for purposes of income is deducted from the annual subscription fee revenue collected from each new user. Nevertheless, this solves the problem of having sufficient books in the system and initializing each new user with some credits.

It is possible that when user 1 ships a book to user 2, user 2 may claim that he/she did not receive it, whether he/she actually did or not. This creates a shortage in the system of one book. User 1 says that he/she shipped the book and will want the credit for doing so. User 2 wants the book. This situation may be caused by (a) user 1 never shipping the book, but saying he/she did ship it; (b) user 2 received it, but is denying it; or the delivery service lost the book in transit.

One solution to this scenario is to issue the credit expected by user 1 and to resend the same copy of the book requested by user 2 from another user who also has the same book. This now means that the system is short one extra book credit and the system must be replenished with one additional book. Now, the system must be replenished with the equivalent of 2 books.

User 2 in either situation is: (a) happy, because he/she finally got the book, or (b) user 2 has 2 copies of the same book. If the swapping service does not hear from user 2 again, then it may be assumed scenario (a) is true. If however, user 2 complains that he/she did not receive the book again from another user who had the same book, the service will contact user 2 and ask for an explanation. Customer Service may then decide whether to continue to support this user on or to kick them out of the system and refund part of their subscription fee (based on number of credits used and time in the system for the annual membership).

The system will also monitor user 1 to see if a pattern develops with that user claiming to have sent out a book and it not being received. If a pattern develops with user 1 not sending the book out more than once, then the system may determine whether this person should continue to be a member of the system.

When a book is not delivered, for any reason, then system may request another book from another member and still issue a credit for the original sender. This means that the service will have to cover the cost of replenishing a lost book and a lost credit. Further financial exposure is created.

Assume that the average person swaps 10 books per year. In reviewing the United States Postal Service's data on mail delivery, less than 1% of the U.S. mail is not delivered for some reason. Taking into account undelivered mail and add the dishonest people, then:

1 book lost by USPS—results in 1 book needing to be added back into the system.

2 books taken by dishonest members of the service—results in two more books added back into system. There is a financial impact of inserting one book into the system for each missing book through either loss or dishonesty. In the above scenario, a total of 3 books out of 100 books shipped must be added back into the system.

A total of 6 books out of 100 books shipped must be added back into the system.

Turning to FIGS. 16-19, a feature called "Wish List" will be described. If a member wants a book that is not active in the system at that given time, the member may add it to his/her Wish List and the system will notify that member when it becomes available, that is, when another member has listed it as being available for swapping. Likewise if a member sees a book on the Global Wish List (a list maintained by the system for books that members have entered into their personal Wish Lists) and a particular member has one of them in his/her collection but has not listed it, then that member can decide to list that book and be reasonably assured that someone will request it. It makes it more a "sure-swap", and the member who ships that item will of course receive a credit when the Wish List member confirms receipt of the book.

Figure 16:
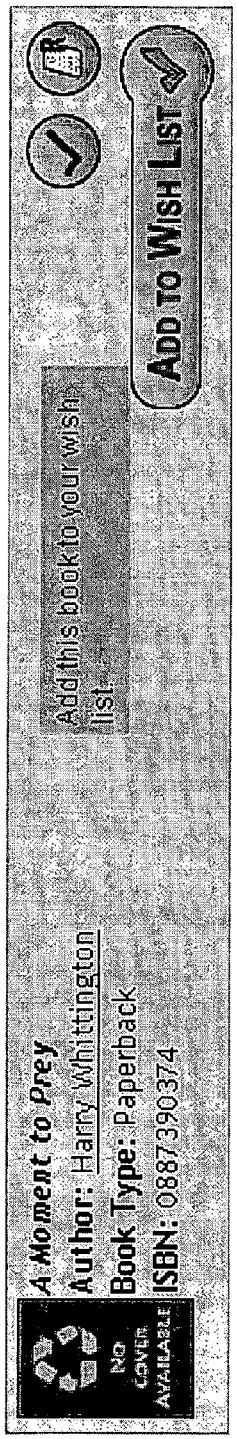
Figure 17:
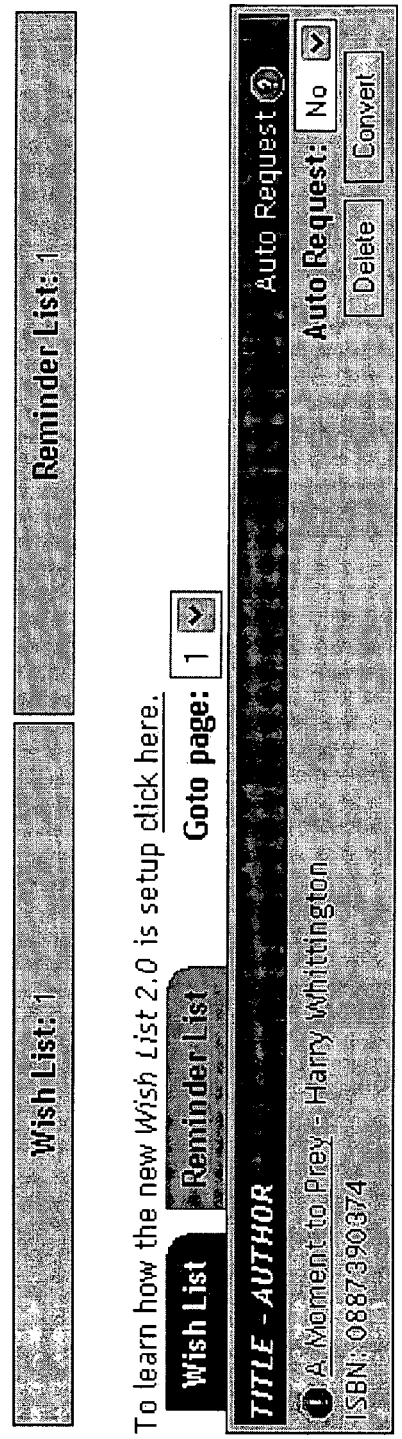
Figure 18:
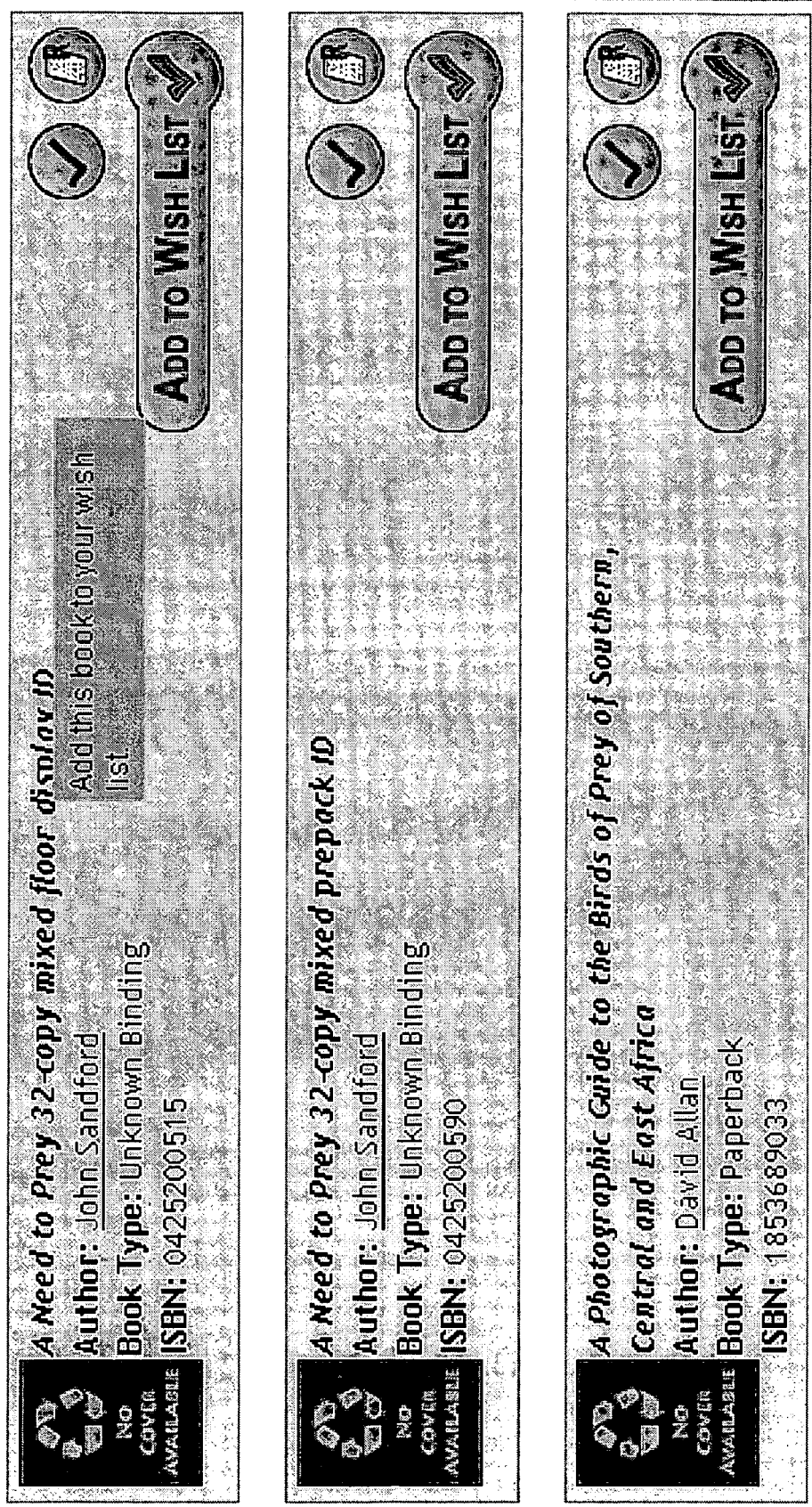

First, with reference to FIGS. 16-18, the manner in which a member sets up his/her wish list will be described. FIG. 16 shows that a member can search for a book using the searching tools described above. The system will search to determine whether it is currently in the database and available from another member. If the book is in the database and is listed as being available from another member is, then the member will be given the option of requesting that book, as shown in FIG. 17. However, if the book is in the system's database, but is not listed as being available from another member, then the book can still be added to the member's Wish List as shown in FIG. 18. Thus, when the book is listed by another member, the member with it in his/her Wish List will be notified and given the option of requesting it. If that member who has that book on his/her Wish List no longer wants the book when it is eventually listed by another member, then that book will become part of the regular listing of available books. For example, a member may put the item on his/her wish list upon searching for it on the system and finding that it is not available, but after some period of time, that member may decide to find the book elsewhere but forget to delete it from his/her wish list. On the other hand, if the book is not in the system's database as being a book in print, then a screen such as the one shown in FIG. 19 may be displayed, indicating that the system database does not contain the book, but that the database is updated frequently and if a member lists it, it will certainly become available.

FIG. 20 illustrates the Global Wish List feature whereby the books in each member's Wish List is made available and searchable by all members. In this way, if a member has a book in his/her collection (but has not yet listed it) that is on the Global Wish List, he or she can list it and know that a credit will likely be secured by shipping it to the member with that book on his/her Wish List, if that member still wants it. If that member with who has that book on his/her Wish List no longer wants the book when it is eventually listed by another member, then that book will become part of the regular listing of available books. If that member who has that book on his/her Wish List no longer wants the book when it is eventually listed by another member, then that book will become part of the regular listing of available books.

Another Wish List related feature is to provide a separate wish list for items that a member may desire when the member does not have any credits to order it or does not otherwise want to put that item on his/her main Wish List. This secondary Wish List makes it more fair to other members that have available credits or otherwise have that item on their main Wish List so that those members have priority to that item once it is listed.

On a nightly basis, the system will review all of the Wish List data entered that day and notify members (via a web link, email, system message, etc.) so that members can look through their collections to see if they have an item that is on the latest Wish Lists.

Turning to FIGS. 21-23, the Save Search feature will be described. A user may frequently perform the same searches each time he/she signs onto the system. To save that user's effort, the system may save the search and send the member a nightly email notifying him/her if any new books for that search were posted in the last 24 hours, or some other time interval. Any time a user does a search, a particular icon may be displayed with those search results (as shown in FIGS. 21 and 22). When the user clicks or selects that icon, the system will prompt the user as shown in FIG. 22 to enter a name for the search, and then click the "Save Search" button. Then, as shown in FIG. 23, the user can tell the system, in his/her account preferences for "Saved Searches" whether to send an email daily for results that match that search. This allows the user to enter a search in one time, but lets the system do the work of running that search on a daily basis to alert the user of any items that match the search. For example, the system may conduct the search nightly and send an email the following morning. Any of the parameters that can be used in the search criteria can be saved as part of a saved search. These parameters are described above in connection with FIGS. 9 and 10.

FIG. 24 illustrates the Daily Digest feature. This feature allows a user to select genre or other more specific search parameters that the system performs on a daily (such as every evening) basis. The system will send a nightly email for just the genres selected in the Daily Digest genre parameters. The email includes all books posted into the system in the last 24 hours, for example, that fit that set of criteria. The user may configure the Daily Digest feature to perform the search and send an email on a desired basis, e.g., weekly, monthly, quarterly, etc., rather than a daily basis. Any or all of the parameters that are available for a search (described above in connection with FIGS. 9 and 10) can be used with the Daily Digest feature.

Figure 25:
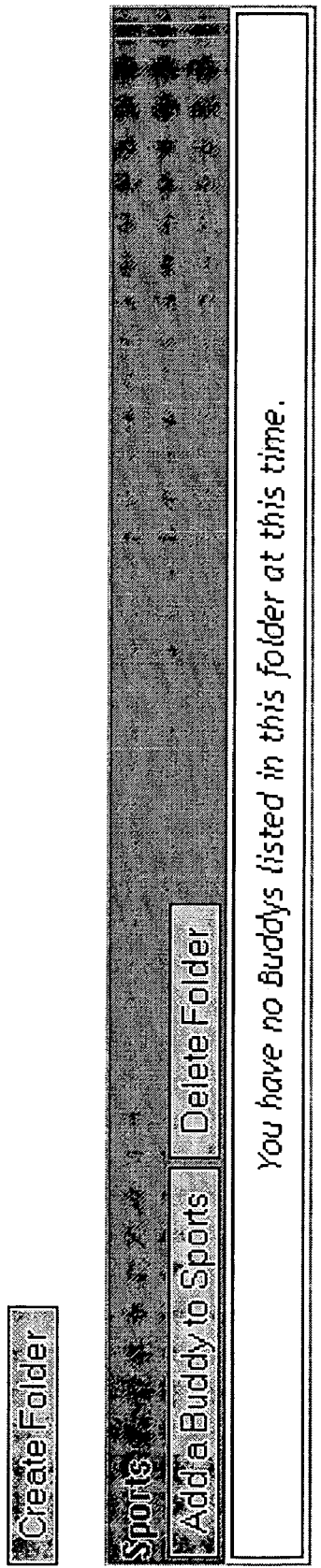

Turning to FIGS. 25 and 26, the Buddy List feature will be described. The Buddy List feature allows a member to create folders by topic, genre, author, etc., to associate with one or more other members. Messages can be sent, similar to email messages, between a first member and another member listed on the first member's Buddy List. This may be useful for members who share similar tastes in literature, etc. To this end, the first member will be allowed to see the books listed and contained in the Wish List for the other members on the first member's Buddy List, and visa versa. For example, FIG. 25 shows that a member created a Buddy List called Sports. In this Buddy List, the member may include the member profile name of any member he/she wishes to associate with Sports books. Whenever a particular icon, such as the one in Public Profile listing shown in FIG. 26, a member may select to add a member to his/her particular Buddy List to keep tabs on their current list of books and also their Wish List. You can even send them a personal message. The Buddy List feature may even tell a member when one of his/her "Buddies" are online with the system.

Figures 27, 28:
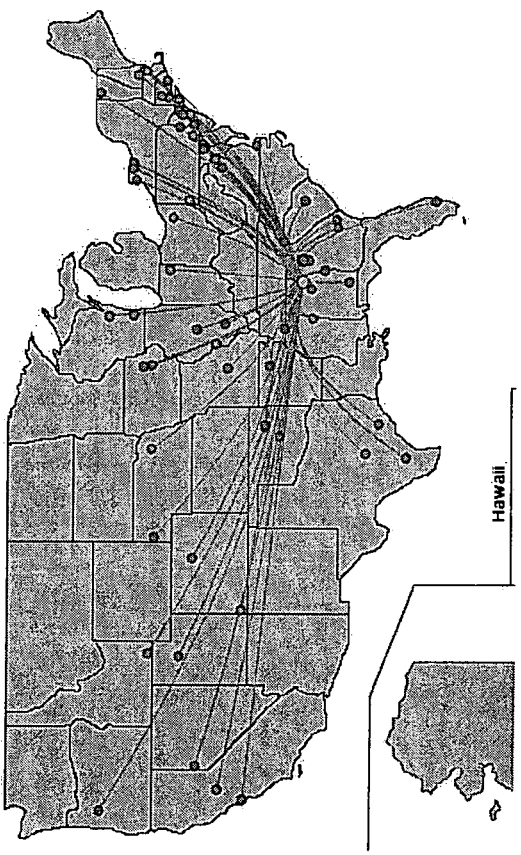

Turning to FIGS. 27-29, the Public Profiles feature will be described. The system maintains information on each member, including certain information concerning a member's usage of the system that is appropriate to share with any other member. For example, a member can see the titles of books a particular member has mailed to other members, and also the titles of books that particular member has ordered from other members. FIG. 27 shows, for a member, statistics concerning that member's usage of the system such as number of books ordered, number of books listed, etc., as shown. In addition, the system keeps track of where, in the U.S., a member has shipped books to other members as shown in FIG. 28, and also from where a particular member has received books from other members as shown in FIG. 29. When viewing the maps displaying books mailed from one member to another, a user can click on the dot which displays a pop-up graphic representing a particular member to see other books currently listed by that particular member.

Thus, for each member, a map may be displayed that shows all of the books are shipped from that member and geographically where that member received books from other members. In this screen a user may click on any source or destination member to send that member a message or see all of the books listed by that member, order one of those books or look at that member's wish list. Moreover, a member interested in that item may request to see a map that displays geographical locations of the members to which that particular item was shipped prior to shipment to the next member that requests the item or shipment to that interested member if he/she requests the item.

Related to the map feature is a book tracking feature. Each time a member posts a book that matches (by title) a book that he/she ordered from another member, the system stores data to track its path from one member to another member. In the course of tracking this information, the system may provide members along its path to share comments with other members in its path, exchange personal messages, conduct discussion forums etc., about that book.

Furthermore, the system may also maintain records of transactions conducted by members to keep track of which member or members ("Top Swappers") have the most transactions with the service.

Still another feature is called the "Box-of-Books" swap feature. This allows members to ship books to each other for lower shipping cost per book, and without using their credits. Suppose member A has 30 books listed in his account and member B has 25 books in their list. In addition, suppose that members A and B are both willing to mail multiple books to each other to save on postage.

Member A searches member B's book list to select as many books as member A is willing to trade with member B. For example, member B has 10 books that member A would like. Member A may "prioritize" those books from 1 to 10 in the system (with 1 being the most important, and 10 being the least important).

The system sends an email invitation to the other member B asking him if he would like to trade up to 10 books with member A. Member B then logs onto the system and views the books listed by member A. Suppose that member B is interested only in 7 of member A's books. Member A mails those 7 books to member B, and member B mails the top 7 picked books to member A. Of course if member A still wants the remaining 3 books, he can use regular book credits to order them from member B. Then, member B will have the opportunity to request books from that member or other members using those 3 credits once the books are shipped member A.

The system may suggest that for bulk shipment, a member uses the U.S. Postal Service's (USPS) Media Mail service and have it certified or delivery confirmation at the Post Office so that the shipment is "protected". In addition, the system will link to the USPS's tracking system to that a member received the bulk shipment. There is no need for a user to log into the system to record the receipt of the books.

The example below explains the savings that can be had when sending multiple books to one location (in bulk) instead of sending them one at a time (for USPS media mail rates as of the filing date of this application).

| Number of Books | Shipping Cost When Mailed in Bulk | Savings Compared to Mailing Separately |
|---|---|---|
| 1 | $1.42 | 0 |
| 2 | $1.84 + .55 = $2.39 | 54 cents (2 × $1.42-$2.39) |
| 3 | $1.84 + .55 = $2.39 | $1.87 (3 × $1.42-2.39) |
| 4 | $1.84 + .55 = $2.39 | $3.29 (4 × $1.42-2.39) |

-continued

| Number of Books | Shipping Cost When Mailed in Bulk | Savings Compared to Mailing Separately |
|---|---|---|
| 5 | $2.26 + .55 = $2.81 | $4.29 (5 × $1.42-2.81) |
| 6 | $2.26 + .55 = $2.81 | $5.71 (6 × $1.42-2.81) |
| 7 | $2.68 + .55 = $3.23 | $6.71 (7 × $1.42-3.23) |
| 8 | $2.68 + .55 = $3.23 | $8.13 (8 × $1.42-3.23) |
| 9 | $3.10 + .55 = $3.65 | $9.13 (9 × $1.42-3.65) |
| 10 | $3.10 + .55 = $3.65 | $10.55 (10 × $1.42-3.65) |

Following this example, if a member mails 10 books together, the shipping cost per book is approximately 37 cents. This example assumes the following Media Mail Rates: 1 lb=$1.42; 2 lb=$1.84; 3 lb=$2.26; 4 lb=$2.68; 5 lb=$3.10 plus delivery confirmation of 55 cents.

It should be further understood that a user may order multiple books from the same member using credits and that member may ship the requested books in bulk to the ordering member. This will save postage as well, but credits were used for this transaction as in a typical transaction, unlike the "Box-of-Books" arrangement explained above.

To further promote the system, members may, at their option, receive software code from the service that they can insert in their emails to display a logo, URL, browser bookmarks, web site banner or other promotional identifying information, that is then displayed to non-members that receive emails from a member (outside of the system). In addition, the system may issue credit to members who refer new members to the service. The system may have a screen that allows a member to enter the email addresses for other people. The system will send a greeting and informational email to those email addresses, as well as reminder emails some period of time later if those people have not yet enrolled with the system. The system will keep track of which member supplied those email addresses so that when a person registers with the system using one of those supplied email address, the system can issue a credit to the corresponding member that supplied that email address.

The system may provide an "Away from Home" feature. If a member is traveling or otherwise unable to ship an item requested by another member, he/she may log in to the system before such time and configure the system to temporarily suspend his/her account. When a member requests the system to temporarily suspend his/her account, the system does not consider the items listed by the member as part of items available for swapping. When the member returns and/or deactivates this feature, the member's items are considered part of the database and available for swapping again. In addition, the member maintains his/her "position" with respect to a first-in first-out (FIFO) policy for items listed by that member (that are also listed by other members) prior to the temporary account deactivation.

Still another feature is a list called a "Books I've Read" list. The system may, for each member, track books that a member has ordered so that the user does not inadvertently order the same book again. One implementation of this feature is to automatically add a book to this list when a member requests or orders it from another member. Then, the next time the member requests or orders this same book, the system may display a prompt to the user to remind him/her that the book being requested matches one that the member had previously requested. The member can elect to bypass this reminder and order the book despite the reminder.

The above description is intended by way of example only.

What is claimed is:

1. A system for managing swaps of tangible items, comprising:
   an Internet connection;
   an electronic database; and
   a server computer that is connected to the electronic database, and communicates with users through the Internet connection, wherein the server computer is programmed to:
   register a first user in the electronic database, receive a first name of a first tangible item to list from the first user through the Internet connection, store the first name in the electronic database, and list the first name on a web site of the server computer;
   register a second user in the electronic database, receive a second name of a second tangible item to list from the second user through the Internet connection, store the second name in the electronic database, and list the second name on the web site of the server computer;
   register a third user in the electronic database, receive a third name of a third tangible item to list from the third user through the Internet connection, store the third name in the electronic database, and list the third name on the web site of the server computer;
   receive a first request through the Internet connection from the first user for the second tangible item that begins a first transaction removes a first credit from the first user in the electronic database that was stored for the first user during a previous transaction, send a first message through the Internet connection to the second user requesting that the second tangible item be shipped to the first user, receive a second message through the Internet connection confirming receipt of the second tangible item, and store a second credit for the second user in the electronic database to complete the first transaction;
   receive a second request through the Internet connection from the second user for the third tangible item that begins a second transaction removes the second credit from the second user in the electronic database, send a third message through the Internet connection to the third user requesting that the third tangible item be shipped to the second user, receive a fourth message through the Internet connection confirming receipt of the third tangible item, and store a third credit for the third user in the electronic database to complete the second transaction;
   use the first credit, the second credit, and the third credit to manage a swap of the second tangible item and the third tangible item among the first user, the second user, and the third user, wherein the first credit, the second credit, and the third credit each represent a right to request a future swappable tangible item for the equivalent value of at least one previously swapped tangible item; and
   issue one or more credits initially to a user so that the swapping process can begin.

2. The system of claim 1, wherein second message is received from the first user.

3. The system of claim 1, wherein the second message is received from an automatic delivery confirmation feature.

4. The system of claim 1, wherein the third tangible item comprises a book.

5. The system of claim 4, wherein the third name comprises an international standard book number (ISBN).

6. The system of claim 1, wherein the third tangible item comprises a compact disc (CD).

7. The system of claim 1, wherein the third tangible item comprises a digital video disc (DVD).

8. The system of claim 1, wherein the second tangible item comprises a book.

9. The system of claim 8, wherein the second name comprises an international standard book number (ISBN).

10. The system of claim 1, wherein the second tangible item comprises a compact disc (CD).

11. The system of claim 1, wherein the second tangible item comprises a digital video disc (DVD).

12. The system of claim 1, wherein the server computer is further programmed to:
    receive a request through the Internet connection from the first user for a plurality of tangible items not listed on the web site and store the plurality of tangible items in the electronic database.

13. The system of claim 1, wherein the first message comprises a mailing wrapper in the form of form of a document, wherein the document contains the mailing address of the first user and the document is formatted so that the document can be printed from a standard computer printer using standard printer paper.

14. The system of claim 1, wherein the server computer is further programmed to:
    receive a third request through the Internet connection from the third user to send the first tangible item to a fourth user that begins a third transaction, remove the third credit from the third user in the electronic database, send a fifth message through the Internet connection to the first user requesting that the first tangible item be shipped to the fourth user, receive a sixth message through the Internet connection confirming receipt of the first tangible item, and store a fourth credit for the first user in the electronic database to complete the third transaction wherein the fourth credit represents a right to request a future swappable tangible item for the equivalent value of at least one previously swapped tangible item.

15. The system of claim 14, wherein the fourth user is a registered user in the electronic database.

16. The system of claim 14, wherein the fourth user is not a registered user in the electronic database.

17. The system of claim 1, wherein before the first transaction the server computer is further programmed to:
    receive a first location from the first user and store the first location in the electronic database.

18. The system of claim 17, wherein, after the transaction, the server computer is further programmed to:
    display a map on the web site, locate the first location on the map, and place a graphic at the first location on the map representing the first user.

19. The system of claim 18, wherein the server computer is further programmed to:
    display a pop-up from the web site if a user clicks on the graphic.

20. The system of claim 19, wherein the pop-up comprises information about the first user.

21. The system of claim 1, wherein, before the transaction, the server computer is further programmed to:
    receive a second location from the second user and store the second location in the electronic database.

22. The system of claim 21, wherein, after the transaction, the server computer is further programmed to:

display a map on the web site, locate the second location on the map, and place a graphic at the second location on the map representing the second user.

23. The system of claim 22, wherein the server computer is further programmed to:
display a pop-up from the web site if a user clicks on the graphic.

24. The system of claim 23, wherein the pop-up comprises information about the second user.

25. A method for managing swaps of tangible items, comprising:
registering a first user in an electronic database, receiving a first name of a first tangible item to list from the first user through an Internet connection, storing the first name in the electronic database, and listing the first name on a web site using a server computer;
registering a second user in the electronic database, receiving a second name of a second tangible item to list from the second user through the Internet connection, storing the second name in the electronic database, and listing the second name on the web site using the server computer;
registering a third user in the electronic database, receiving a third name of a third tangible item to list from the third user through the Internet connection, storing the third name in the electronic database, and listing the third name on the web site using the server computer;
receiving a first request through the Internet connection from the first user for the second tangible item that begins a first transaction removing a first credit from the first user in the electronic database that was stored for the first user during a previous transaction, sending a first message through the Internet connection to the second user requesting that the second tangible item be shipped to the first user, receiving a second message through the Internet connection confirming receipt of the second tangible item, and storing a second credit for the second user in the electronic database to complete the first transaction, using the server computer;
receiving a second request through the Internet connection from the second user for the third tangible item that begins a second transaction removing the second credit from the second user in the electronic database, sending a third message through the Internet connection to the third user requesting that the third tangible item be shipped to the second user, receiving a fourth message through the Internet connection confirming receipt of the third tangible item, and storing a third credit for the third user in the electronic database to complete the second transaction, using the server computer; and
using the first credit, the second credit, and the third credit to manage a swap of the second tangible item and the third tangible item among the first user, the second user, and the third user, wherein the first credit, the second credit, and the third credit each represent a right to request a future swappable tangible item for the equivalent value of at least one previously swapped tangible item; and
issuing one or more credits initially to a user so that the swapping process can begin.

26. The method of claim 25, wherein the second message is received from the first user.

27. The method of claim 25, wherein the second message is received from an automatic delivery confirmation feature.

28. The method of claim 25, wherein the third tangible item comprises a book.

29. The method of claim 28, wherein the third name comprises an international standard book number (ISBN).

30. The method of claim 25, wherein the third tangible item comprises a compact disc (CD).

31. The method of claim 25, wherein the third tangible item comprises a digital video disc (DVD).

32. The method of claim 25, wherein the second tangible item comprises a book.

33. The method of claim 32, wherein the second name comprises an international standard book number (ISBN).

34. The method of claim 25, wherein the second tangible item comprises a compact disc (CD).

35. The method of claim 25, wherein the second tangible item comprises a digital video disc (DVD).

36. The method of claim 25, further comprising receiving a request through the Internet connection from the first user for a plurality of tangible items not listed on the web site and storing the plurality of tangible items in the electronic database using the server computer.

37. The method of claim 25, wherein the first message comprises a mailing wrapper in the form of form of a document, wherein the document contains the mailing address of the first user and the document is formatted so that the document can be printed from a standard computer printer using standard printer paper.

38. The method of claim 25, further comprising receiving a request through the Internet connection from the third user to send the first tangible item to a fourth user that begins a third transaction, removing the third credit from the third user in the electronic database, sending a fifth message through the Internet connection to the first user requesting that the first tangible item be shipped to the fourth user, receiving a sixth message through the Internet connection confirming receipt of the first tangible item, and storing a fourth credit for the first user in the electronic database to complete the third transaction, using the server computer, wherein the fourth credit represents a right to request a future swappable tangible item for the equivalent value of at least one previously swapped tangible item.

39. The method of claim 38, wherein the fourth user is a registered user in the electronic database.

40. The method of claim 38, wherein the fourth user is not a registered user in the electronic database.

41. The method of claim 25, further comprising, before the first transaction, receiving a first location from the first user and storing the first location in the electronic database using the server computer.

42. The method of claim 41, further comprising, after the first transaction, displaying a map on the web site, locating the first location on the map, and placing a graphic at the first location on the map representing the first user using the server computer.

43. The method of claim 42, further comprising displaying a pop-up from the web site if a user clicks on the graphic using the server computer.

44. The method of claim 43, wherein the pop-up comprises information about the first user.

45. The method of claim 25, further comprising, before the first transaction, receiving a second location from the second user and storing the second location in the electronic database using the server computer.

46. The method of claim 45, further comprising, after the first transaction, displaying a map on the web site, locating the second location on the map, and placing a graphic at the second location on the map representing the second user using the server computer.

47. The method of claim 46, further comprising displaying a pop-up from the web site if a user clicks on the graphic using the server computer.

48. The method of claim 47, wherein the pop-up comprises information about the second user.

49. A non-transitory computer-readable medium, whose contents include a program, which, when executed on a server computer, performs a method for managing swaps of tangible items, comprising:

registering a first user, receiving a first name of a first tangible item to list from the first user, storing the first name, and listing the first name on a web site using a registration module;

registering a second user, receiving a second name of a second tangible item to list from the second user, storing the second name, and listing the second name on the web site using the registration module;

registering a third user, receiving a third name of a third tangible item to list from the third user, storing the third name, and listing the third name on the web site using the registration module;

receiving a first request from the first user for the second tangible item that begins a first transaction and removing a first credit from the first user that was stored for the first user during a previous transaction using a request an item module;

sending a first message to the second user requesting that the second tangible item be shipped to the first user, receiving a second message confirming receipt of the second tangible item, and storing a second credit for the second user to complete the first transaction using a ship an item module;

receiving a second request from the second user for the third tangible item that begins a second transaction and removing the second credit from the second user using the request an item module;

sending a third message to the third user requesting that the third tangible item be shipped to the second user, receiving a fourth message confirming receipt of the third tangible item, and storing a third credit for the third user to complete the second transaction using the ship an item module;

using the first credit, the second credit, and the third credit to manage a swap of the second tangible item and the third tangible item among the first user, the second user, and the third user, wherein the first credit, the second credit, and the third credit each represent a fight to request a future swappable tangible item for the equivalent value of at least one previously swapped tangible item; and issuing one or more credits initially to a user so that the swapping process can begin.

50. The computer-readable medium of claim 49, further comprising receiving a third request from the third user to send the first tangible item to a fourth user that begins a third transaction and removing the third credit from the third user using the request an item module, sending a fifth message to the first user requesting that the first tangible item be shipped to the fourth user, receiving a sixth message confirming receipt of the first tangible item, and storing a fourth credit for the first user to complete the third transaction using the ship an item module, wherein the fourth credit represents a right to request a future swappable tangible item for the equivalent value of at least one previously swapped tangible item.

51. The computer-readable medium of claim 50, wherein the fourth user is a registered user.

52. The computer-readable medium of claim 50, wherein the fourth user is not a registered user.

* * * * *